US008788492B2

(12) United States Patent
Lu et al.

(10) Patent No.: US 8,788,492 B2
(45) Date of Patent: Jul. 22, 2014

(54) SEARCH SYSTEM AND METHODS WITH INTEGRATION OF USER ANNOTATIONS FROM A TRUST NETWORK

(75) Inventors: Qi Lu, Saratoga, CA (US); Eckart Walther, Palo Alto, CA (US); David Ku, Palo Alto, CA (US); Chung-Man Tam, San Francisco, CA (US); Kevin Lee, East Palo Alto, CA (US); Zhichen Xu, San Jose, CA (US); Ali Diab, Menlo Park, CA (US); Kenneth Norton, San Carlos, CA (US); Jianchang Mao, San Jose, CA (US)

(73) Assignee: Yahoo!, Inc., Sunnyvale, CA (US)

( * ) Notice: Subject to any disclaimer, the term of this patent is extended or adjusted under 35 U.S.C. 154(b) by 598 days.

(21) Appl. No.: 11/082,202

(22) Filed: Mar. 15, 2005

(65) Prior Publication Data

US 2005/0256866 A1   Nov. 17, 2005

Related U.S. Application Data

(60) Provisional application No. 60/623,282, filed on Oct. 28, 2004, provisional application No. 60/553,577, filed on Mar. 15, 2004.

(51) Int. Cl.
   *G06F 17/30* (2006.01)

(52) U.S. Cl.
   USPC .......................................... 707/732; 709/225

(58) Field of Classification Search
   CPC ................................................ G06F 17/30525
   USPC ........................ 707/1, 3, 5, 102, 732; 709/225
   See application file for complete search history.

(56) References Cited

U.S. PATENT DOCUMENTS

| 5,392,428 | A | 2/1995 | Robins |
|---|---|---|---|
| 6,181,336 | B1 | 1/2001 | Chui et al. |
| 6,675,213 | B1 | 1/2004 | Schmonsees |
| 7,143,091 | B2 | 11/2006 | Charnock et al. |
| 7,203,753 | B2 * | 4/2007 | Yeager et al. .................. 709/225 |
| 2002/0078003 | A1 * | 6/2002 | Krysiak et al. ..................... 707/1 |
| 2002/0147895 | A1 * | 10/2002 | Glance et al. ................. 711/158 |
| 2003/0182310 | A1 | 9/2003 | Charnock et al. |
| 2003/0216942 | A1 * | 11/2003 | Hawks .............................. 705/2 |
| 2005/0027664 | A1 * | 2/2005 | Johnson et al. .................. 706/12 |
| 2005/0131866 | A1 * | 6/2005 | Badros et al. ...................... 707/3 |
| 2005/0182745 | A1 * | 8/2005 | Dhillon et al. .................... 707/1 |
| 2005/0234958 | A1 * | 10/2005 | Sipusic et al. ................ 707/102 |

OTHER PUBLICATIONS

RB Almeida and VAF Almeida. *A Community-Aware Search Engine* In Proceedings of the 13th International Conference on World Wide Web, pp. 413-421. 2004.

(Continued)

*Primary Examiner* — Apu Mofiz
*Assistant Examiner* — Chelcie Daye
(74) *Attorney, Agent, or Firm* — Pillsbury Winthrop Shaw Pittman LLP

(57) ABSTRACT

Computer systems and methods incorporate user annotations (metadata) regarding various pages or sites, including annotations by a querying user and by members of a trust network defined for the querying user into search and browsing of a corpus such as the World Wide Web. A trust network is defined for each user, and annotations by any member of a first user's trust network are made visible to the first user during search and/or browsing of the corpus. Users can also limit searches to content annotated by members of their trust networks or by members of a community selected by the user.

46 Claims, 18 Drawing Sheets

(56) References Cited

OTHER PUBLICATIONS

"Dude, Check This Out!" downloaded from the Internet at http://www.dudecheckthisout.com/index.aspx on Mar. 10, 2004.

"Dude, Check This Out!User Guide" downloaded from the Internet at http://www.dudecheckthisout.com/user-guide.aspx on Mar. 10, 2004.

"How Eurekster Works" downloaded from the internet at http://home.eurekster.com/howitworks.htm on Mar. 10, 2004.

"Stumbleupon, How does it work?" downloaded from the Internet at http://www.stumbleupon.com//how.html on Mar. 10, 2004.

"Stumbleupon, What is Stumbleupon?" downloaded from the Internet at http://www.stumbleupon.com/what.html on Mar. 10, 2004.

Davies, N. J. et al., Information Agents for the World Wide Web, BT Technology Journal, Oct. 1996, pp. 105-114, vol. 14, No. 4.

Schubert, P. et al, Collaboration platforms for virtual student communities, System Sciences, 2003, Proceedings of the 36th Annual Hawaii International Conference on Jan. 6-9, 2003, Piscataway, NJ, USA, IEEE,Jan. 6, 2003, pp. 214-223, XP010626591, ISBN:0-7695-1874-5.

European Office Action dated Jun. 30, 2008 in corresponding European Patent Application No. 05730929.6.

European Office Action dated Aug. 6, 2013 in corresponding European Patent Application No. 05730929.6.

* cited by examiner

Author ID: *user42*

URL: *http://www.domain.tld/adir/*

Host Flag: *Page*

Title: *Chinese Food Directory*

Abstract: *Index Sunnyvale's best Chinese restaurants*

Referral: *q=chinese+food+sunnyvale*

Old Referral:

Last Updated: *2004-02-01 00:01:02*

Last Visited: *2004-02-21 21:04:04*

Keywords: *chinese, food, local*

Description: *Best list I've found for Chinese food in Sunnyvale. Has great reviews.*

Rating: *+2*

FIG. 3

Search Results  940

Search | chinese food sunnyvale | Submit

My Web      948

—950

Chinese Food Directory
     ... An index of Chinese food in your local area ... Sunnyvale CA ~~ Chinese ...
         http://www.domain.tld/adir

*My comments: Great directory!* ← 952

/ 954

| More (5 comments) |

*Bob Smith said: Lots of listings, but no reviews.*

Food —950

... ~~~~ El Camino Real, Sunnyvale (and other locations)... This is probably the worst
Chinese food I've ever had ...
         http://somedomain.tld/dir2/this.htm                           / 956

| Save This |

*Bob Smith said: ~~~~ stinks. Never eat there.*
                                   ← 952          | More (3 comments) |
*John Q. Doe said: I don't know who wrote this review, but he's nuts.
I eat at ~~~~ all the time and it's usually very good.*

Search My Web 1100
Scope of Search:
◉ Use My Trust Network | <u>Show Trust Network</u>  1104  1102
○ Use My Pages Only
○ Search Entire Web
Search For: 1112
in Page: ⬚ 1114
in Title: ⬚ 1116
in Keywords: ⬚ 1118
in Description: ⬚ 1120
in Referral: ⬚ 1121
Ratings:
◉ Any
○  Only  1122
○  Only
[ Submit ] 1126    [ Reset ] 1128
FIG. 11

1302
User B's Folders:

| Folder | Privacy | Annotations |
|--------|---------|-------------|
| Main | Public | J1, J2, J3 |
| F1 | Private (Access: E) | J4, J5 |
| F2 | Private (Access: A,C) | J6 |
| F3 | Public | J7, J8 |
| F4 | Shared | J9, J10 |

1304
User B's Friends: C, E

1306
User A's Friends: B, C, D, I

FIG. 13

My Library 1400

Search My Library      My Library Options

---

View Options

1402 by Folder: All | Select Folder

☐ by Keyword [ _____ ]    [ Refresh ]

⊙ All Ratings
         ○ Only 
         ○ Only 

Sort by: Folder | Title | Keywords | Rating | Last Update | Last Visit

---

Annotations

1404

☐ <Title>     <Folder>     <Active>
            <Keywords>                 <Last Updated>     [ Edit ]
1406     <Description>            <Last Visited>
            <Rating>
            <Abstract>
            <URL>

⋮

1408                    1410

[ Export Checked ]      [ Export All ]

---

Add This Site: [ _____ ]    [ Go ]

FIG. 14

SEARCH SYSTEM AND METHODS WITH INTEGRATION OF USER ANNOTATIONS FROM A TRUST NETWORK

CROSS-REFERENCES TO RELATED APPLICATIONS

This application claims the benefit of the following two U.S. Provisional Patent Applications:
Application No. 60/553,577, filed Mar. 15, 2004, entitled "Search Systems and Methods with Integration of User Judgments Including Trust Networks"; and
Application No. 60/623,282, filed Oct. 28, 2004, entitled "Search Systems and Methods with Integration of User Judgments Including Trust Networks."
The respective disclosures of these applications are incorporated herein by reference for all purposes.

The present disclosure is related to commonly-owned co-pending U.S. patent application Ser. No. 11/081,860, filed Mar. 15, 2005, entitled "Search Systems and Methods with Integration of User Annotations," the disclosure of which is incorporated herein by reference for all purposes.

BACKGROUND OF THE INVENTION

The present invention relates in general to searching a corpus of documents, and in particular to search systems and methods that leverage user annotations of documents, including annotations provided by the querying user as well as annotations provided by other users who have a trust relationship to the querying user.

The World Wide Web (Web) provides a large collection of interlinked information sources (in various formats including texts, images, and media content) relating to virtually every subject imaginable. As the Web has grown, the ability of users to search this collection and identify content relevant to a particular subject has become increasingly important, and a number of search service providers now exist to meet this need. In general, a search service provider publishes a Web page via which a user can submit a query indicating what the user is interested in. In response to the query, the search service provider generates and transmits to the user a list of links to Web pages or sites considered relevant to that query, typically in the form of a "search results" page.

Query response generally involves the following steps. First, a pre-created index or database of Web pages or sites is searched using one or more search terms extracted from the query to generate a list of hits (usually target pages or sites, or references to target pages or sites, that contain the search terms or are otherwise identified as being relevant to the query). Next, the hits are ranked according to predefined criteria, and the best results (according to these criteria) are given the most prominent placement, e.g., at the top of the list. The ranked list of hits is transmitted to the user, usually in the form of a "results" page (or a set of interconnected pages) containing a list of links to the hit pages or sites. Other features, such as sponsored links or advertisements, may also be included on the results page.

Ranking of hits is often an important factor in whether a user's search ends in success or frustration. Frequently, a query will return such a large number of hits that it is impossible for a user to explore all of the hits in a reasonable time. If the first few links a user follows fail to lead to relevant content, the user will often give up on the search and possibly on the search service provider, even though relevant content might have been available farther down the list.

To maximize the likelihood that relevant content will be prominently placed, search service providers have developed increasingly sophisticated page ranking criteria and algorithms. In the early days of Web search, rankings were usually based on the number of occurrences and/or proximity of search terms on a given page. This proved inadequate, and algorithms in use today typically incorporate other information, such as the number of other sites on the Web that link to a given hit page (which reflects how useful other content providers think the hit page is), in addition to the presence of search terms on the hit page itself. One algorithm allows querying users to provide feedback by rating the hits that are returned. The ratings are stored in association with the query, and previous positive ratings are used as a factor in ranking hits the next time the same query is entered by any user.

Existing algorithms, however, generally do not take into account preferences of individual users. For example, two users who enter the same query could actually be interested in different things; a page or site that is relevant to one user might not be relevant to another. In addition, different users may have different preferences in areas such as how content is organized and displayed, which content providers they trust, and so on, that will affect how they evaluate or rate a given site. Thus, a site that satisfies one user (or many users) might not satisfy the next user who enters the same query, and that user might still give up in frustration.

Another tool for helping individual users find content of interest to them is "bookmarking." Traditionally, bookmarking has been implemented in Web browser programs, and while viewing any page, the user can elect to save a bookmark for that page. The bookmark usually includes the URL (uniform resource locator) for the page, a title, and possibly other information such as when the user visited the page or when the user created the bookmark. The Web browser program maintains a list of bookmarks, and the user can navigate to a bookmarked page by finding the page in his list of bookmarks. To simplify the task of navigating a list of bookmarks, most bookmarking tools allow users to organize their bookmarks into folders. More recently, some Internet-based information services have implemented bookmarking tools that allow a registered user to create and access a personal list of bookmarks from any computer connected to the Internet.

While bookmarking can be helpful, this tool also has its limitations. For instance, even with folders it can be difficult for a user to remember which bookmarked page had a particular item of information that the user might be looking for at a given time. Also, existing bookmarking tools generally do not help the user identify whether he (or she) has already bookmarked a given page, nor do they provide any facilities for searching bookmarked information. Further, existing bookmarking technologies do not provide easy ways for users to share their bookmarks with other users.

Thus, it would be desirable to provide improved tools for helping individual users collect and search content that is of interest to them.

BRIEF SUMMARY OF THE INVENTION

Embodiments of the present invention provide search systems and methods incorporating user judgment information regarding various pages or sites. This information may include judgments from the querying user as well as from other users selected by the querying user as members of his or her "trust network" or some other grouping of users identified by the querying user. For example, in some embodiments, each user who participates in a content annotation system can define a list of friends, where each friend is another user of the system whose annotations the first user would like to share; based on the lists of friends defined by various participating users, a trust network is defined for each user. In some embodiments, a trust network for a user is defined as including members of a well-defined community to which the user belongs. Regardless of how the trust network is defined, annotations by any member of a querying user's trust network can be integrated into the results of subsequent searches of the corpus by the querying user and can also be used in various ways to enhance the querying user's experience of browsing the corpus. In other embodiments, a querying user might specify members of a predefined community (of which the user might or might not be a member), and annotations by any member of that community can be integrated into search results for the querying user and can also be used to enhance the querying user's browsing experience.

According to one aspect of the present invention, a method for responding to a user query includes receiving a query submitted by a querying one of a number of users and searching a corpus comprising a number of documents to identify one or more hits, where each hit is a document in the corpus that is determined to be relevant to the query. A trust network is built for the querying user, the trust network having as members a subset of the users including at least one user other than the querying user. A store of annotations created by the users is accessed; each annotation is associated with a subject one of the documents in the corpus and with a creating one of the users, and each annotation includes user specific metadata related to the subject document. At least one "annotated hit" is identified, where an annotated hit is a hit that is also the subject document of at least one matching annotation, where the creating user of each matching annotation is one of the members of the trust network. A search report including a listing of the hits is generated. For each annotated hit, the search report also includes information about the matching annotation(s). The corpus can include, for example, a plurality of World Wide Web pages, and the user can be a human or a computer (or a human operating a computer).

In some embodiments, the members of the trust network include at least one other user explicitly identified by the querying user as a friend. For example, a trust network interface can be provided, where the trust network interface is operable by the users to identify other users as friends. Via the trust network interface, identifications of friends are received from a number of inputting users, including the querying user. A list of identified friends for each inputting user is stored. Some embodiments may also allow trust weight to be assigned each friend in the list of identified friends. The trust weight can be assigned, e.g., based on a user input received via the trust network interface.

In other embodiments, building the trust network for the querying user includes automatically populating a list of identified friends for the querying user from a list of users with whom the querying user communicates. This list of users may include, e.g., a list of instant messaging contacts maintained by the querying user, an e-mail address book maintained by the querying user, a list of members of a community to which the querying user belongs, or the like. A trust network interface operable by the querying user to edit the automatically populated list of friends may also be provided.

Where lists of identified friends are used, building the trust network for the querying user advantageously includes retrieving a list of identified friends for the querying user and adding, as a member of the trust network, at least one of the identified friends of the querying user. A list of identified friends for a first one of the trust network members may also be retrieved, and at least one of the identified friends of the first one of the trust network members may also be added as a member of the trust network. In some embodiments, identified friends of the trust network members that are connected to the querying user with a degree of separation that does not exceed a maximum value are added as members of the trust network. In other embodiments, selecting a user to add to the trust network as a member is based at least in part on the trust weight. The querying user may also be added to the trust network as a member.

Explicit identification of individual users as friends is not required. For example, in some embodiments, the members of the trust network are members of a selected community of users, the selected community being selected by the querying user. The querying user might or might not be a member of the selected community and might or might not be a member of the trust network. In instances where the user selects a community to define the trust network, the user might or might not have access to information identifying individual members of the community.

Annotations can be used in various ways to generate search reports. In some embodiments, the search report generated in response to the querying user's query includes a visual highlight element applied to each hit that is an annotated hit. Where the user specific metadata included in the annotations includes a rating, for each annotated hit, a rating is extracted from each matching annotation and an average rating is computed; the visual highlight element applied to each annotated hit depends on the average rating. In some embodiments, an order for the listing of the hits is determined based at least in part on the average ratings of the annotated hits. In still other embodiments, generating the search report also includes, for each annotated hit, providing in the search report a control element operable by the user to request a display of the user specific metadata of at least one of the matching annotations. In further embodiments, generating the search report also includes generating a separate listing including only annotated hits.

In some embodiments, the method also includes searching the store of annotations to identify one or more additional annotated hits, where each additional annotated hit corresponds to a document in the corpus for which the store of annotations includes an associated annotation for which the creating user is one of the trust network members and the associated annotation includes user specific metadata that is determined to be relevant to the query. The additional annotated hits can be incorporated into the listing of the hits in the search results page. For example, where searching the corpus includes extracting a search term from the user query and identifying as a hit each document in the corpus that contains the search term, searching the store of annotations might include identifying as an additional annotated hit each document in the corpus for which the user specific metadata includes the search term.

In some embodiments, the store of annotations might include at least one annotation that is associated with a group of documents in the corpus, and any hit that is one of the group of documents can be identified as an annotated hit.

The user specific metadata advantageously includes an item of information explicitly input by the user, such as a rating of the associated document, a keyword describing the associated document, a label selected from a predefined vocabulary, a description of the associated document, or the like.

According to another aspect of the present invention, a method for responding to a user query includes receiving a query submitted by a querying one of a number of users. A trust network is built for the querying user, the trust network having as members a subset of the users including at least one user other than the querying user. A store of annotations created by the users is accessed; each annotation in the store is associated with a subject one of a number of documents belonging to a corpus and with a creating one of the users, and each annotation further includes user specific metadata related to the subject document. One or more hits are identified; each hit is a document in the corpus that is determined to be relevant to the query, and each hit is also the subject document of at least one matching annotation, where the creating user of each matching annotation is one of the trust network members. A search report including a listing of the hits is generated and transmitted to the querying user. The corpus can be, for example, the World Wide Web, and the user can be a human or a computer (or a human operating a computer).

The trust network may be built in various ways. For example, the members of the trust network include at least one other user explicitly identified by the querying user as a friend, and a trust network can be built from lists of various users' explicitly identified friends, e.g., as mentioned above. The members of the trust network can also be members of a selected community of users, the community being selected by the user; the user might or might not be a member of the selected community and might or might not know the identities of individual community members.

In some embodiments, identifying the one or more hits includes comparing the query to contents of documents in the corpus.

In another embodiment, identifying one or more hits includes comparing the query to the user specific metadata of annotations in a search pool of annotations for which the creating user is one of the trust network members. For example, a search term can be extracted from the query, and it can be detected for each of the annotations in the search pool, whether the search term is present in the user specific metadata; the associated document is identified as a hit in the event that the search term is present in the user specific metadata. In some embodiments, the user specific metadata includes a plurality of fields and the query may specify which of the fields are to be considered during the act of detecting. Additionally, for each document that is the subject document of at least one of the annotations in the search pool, it can be detected whether the search term is present in the document, and the document can also be identified as a hit in the event that the search term is present in the document.

In some embodiments, the search report includes, for each hit, a control element operable by the user to request a display of the user specific metadata of at least one of the matching annotations. In other embodiments, the search report includes, for each hit, at least some of the user specific metadata from at least one of the matching annotations. In still other embodiments where the user specific metadata included in each matching annotation includes a rating of the subject document and wherein the hits in the listing are placed in an order determined based at least in part on the ratings of the hits.

In some embodiments, the store of annotations might include at least one annotation that is associated with a group of documents in the corpus, and any document that is one of the group of documents can be identified as a hit.

According to a further aspect of the present invention, a computer system for responding to user queries from multiple users includes an index data store, a personalization data store, and a search server communicably coupled to the index data store and the personalization data store. The index data store is configured to store a searchable representation of documents belonging to a corpus. The personalization data store is configured to store annotations, each annotation being associated with a subject one of the documents in the corpus and with a creating one of the users, each annotation including user specific metadata related to the subject document. The search server includes input control logic, search control logic, trust network control logic, personalization control logic, and reporting control logic. The input control logic is configured to receive a query from a querying one of the users. The search control logic is configured to search the index data store to identify one or more hits, wherein each hit is a document in the corpus that is determined to be relevant to the received query. The trust network control logic is configured to build a trust network for the querying user, the trust network having as members a subset of the users including at least one user other than the querying user. The personalization control logic is configured to identify, as an annotated hit, each of the hits that is the subject document of at least one matching annotation, wherein the creating user of each matching annotation is one of the members of the trust network. The reporting control logic is configured to generate a search report including a listing of the hits, the search report further including, for each annotated hit, information about at least one of the matching annotations, and the reporting control logic is further configured to transmit the search report to the querying user.

According to a still further aspect of the present invention, a computer system for responding to user queries from multiple users includes an index data store, a personalization data store, and a search server communicably coupled to the index data store and the personalization data store. The index data store is configured to store a searchable representation of documents belonging to a corpus. The personalization data store is configured to store annotations, each annotation being associated with a subject one of the documents in the corpus and with a creating one of the users; each annotation includes user specific metadata related to the subject document. The search server includes input control logic, trust network control logic, search control logic, and reporting control logic. The input control logic is configured to receive a query from a querying one of the users. The trust network control logic is configured to build a trust network for the querying user, where the trust network has as members a subset of the users including at least one user other than the querying user. The search control logic is configured to identify, as a hit, one or more of the documents from the corpus, wherein each hit is determined to be relevant to the query and wherein each hit further is the subject document of at least one matching annotation, where the creating user of each matching annotation is one of the trust network members. The reporting control logic is configured to generate a search report including a listing of the hits and is further configured to transmit the search report to the user.

The following detailed description together with the accompanying drawings will provide a better understanding of the nature and advantages of the present invention.

BRIEF DESCRIPTION OF THE DRAWINGS

FIG. 3 is an example of content fields for an annotation according to an embodiment of the present invention.

FIGS. 9A and 9B are examples of search results pages enhanced with annotation information according to embodiments of the present invention.

FIG. 11 is an example of a Personal Web search interface page according to an embodiment of the present invention.

FIG. 13 is an example of folder privacy settings according to an embodiment of the present invention.

FIG. 14 is an example of a library interface page for interaction with a user's own annotations according to an embodiment of the present invention.

DETAILED DESCRIPTION OF THE INVENTION

Figure 1:
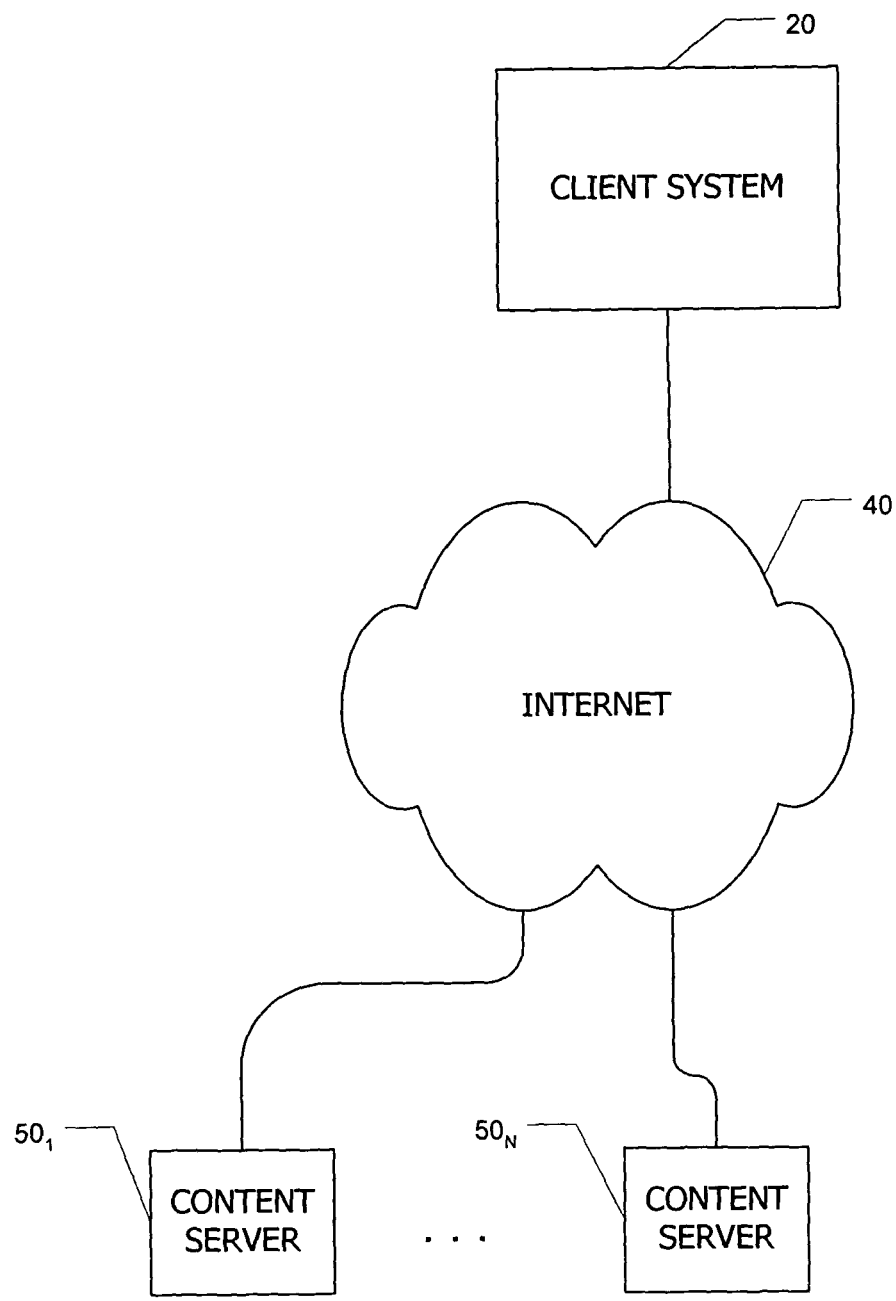
FIG. 1 is a block diagram of an information retrieval and communication network according to an embodiment of the present invention.

Embodiments of the present invention provide systems and methods allowing users to share their annotations relating to various documents (or other content items) found in a corpus such as the World Wide Web. As used herein, the term "annotation" refers generally to any descriptive and/or evaluative metadata related to a document from a corpus where the metadata is collected from a user and thereafter stored in association with an identifier of that user and an identifier of the subject document (i.e., the document to which the metadata relates). Annotations may include various fields of metadata, such as a rating (which may be favorable or unfavorable) of the page or site, one or more keywords or labels identifying a topic (or topics) of the page or site, a free-text description of the page or site, and/or other fields. An annotation is advantageously collected from a user of the corpus and stored in association with an identifier of the user who created the annotation and an identifier of the document (or other content item) to which it relates. Examples of annotations and processes for collecting annotations from users are described in above-referenced application Ser. No. 11/081,860. It is to be understood that the present invention is not limited to particular metadata or to particular techniques for collecting metadata.

In embodiments of the present invention, each user who participates in a content annotation system can define a list of friends, where each friend is another user of the system whose annotations the first user would like to share. Based on the lists of friends defined by various participating users, a trust network is defined for each user, and annotations by any member of a first user's trust network can be integrated into the results of subsequent searches of the corpus by the first user and can also be used in various ways to enhance the first user's experience of browsing the corpus.

For example, when the first user searches the corpus, any hits corresponding to documents that the first user or any other member of the first user's trust network has annotated (referred to herein as "annotated hits") can be highlighted, with a link being provided to allow the user to view such annotations. Where the annotation includes judgment data such as a numerical rating, the judgment data can be aggregated across the first user's trust network, and the annotated hit can be highlighted in a way that indicates whether the judgment was favorable or unfavorable. In addition, aggregated numerical ratings across the first user's trust network can be used for ranking search results in response to the first user's queries, with favorable aggregate ratings tending to increase the ranking of a given page or site and unfavorable aggregate ratings tending to decrease the ranking.

In another embodiment, where the annotations include user-supplied text descriptions and/or descriptive keywords or labels, the first user may have the option to search the content of annotations created by her (or his) trust network members, in addition to or instead of the page content. In other embodiments, any time first the user visits a page that has been annotated by any member of her trust network, a control is provided allowing the first user to view such annotations.

For purposes of illustration, the present description and drawings may make use of specific queries, search result pages, URLs, and/or Web pages. Such use is not meant to imply any opinion, endorsement, or disparagement of any actual Web page or site. Further, it is to be understood that the invention is not limited to particular examples illustrated herein.

I. Overview

A. Network Implementation Overview

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

B. Search and Annotation System Overview

Figure 2:
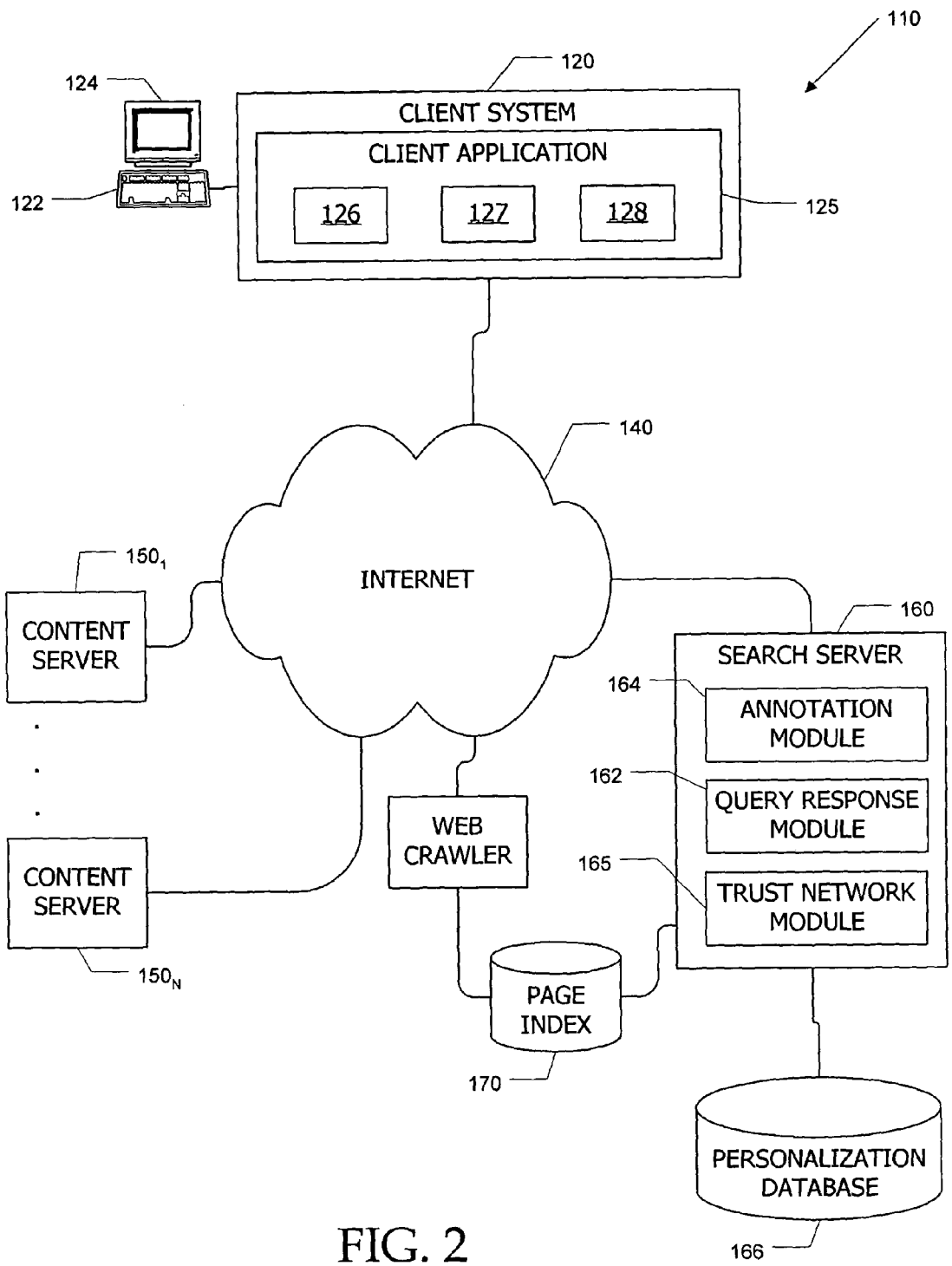
FIG. 2. is a block diagram of an information retrieval and communication network according to another embodiment of the present invention.

FIG. 2 illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As described above, client system 120 and its components are configured to communicate with server systems 150 and 160 and other server systems over the Internet 140 or other communication networks.

According to one embodiment, a client application (represented as module 125) executing on client system 120 includes instructions for controlling client system 120 and its components to communicate with server systems 150 and 160 and to process and display data content received therefrom. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as described above. For example, in one aspect, client application module 125 may be provided over the Internet 140 to client system 120 in an HTML wrapper including various controls such as, for example, embedded JavaScript or Active X controls, for manipulating data and rendering data in various objects, frames and windows.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of applications executing on client system 120 with which application interface module 128 is preferably configured to interface according to aspects of the present invention include various e-mail applications, instant messaging (IM) applications, browser applications, document management applications and others. Further, user interface module 127 may include a browser, such as a default browser configured on client system 120 or a different browser.

According to one embodiment, search server system 160 is configured to provide search result data and media content to client system 120, and content server system 150 is configured to provide data and media content such as web pages to client system 120, for example, in response to links selected in search result pages provided by search server system 160. In some variations, search server system 160 returns content as well as, or instead of, links and/or other references to content. Search server system includes a query response module 162 configured to receive a query from a user and generate search result data therefor, a user annotation module 164 configured to manage user interaction with user-supplied annotation information, and a trust network module 165 configured to manage a trust network for the user. Search server system 160 is communicably coupled to a personalization database 166 that stores data pertaining to specific users of search server system 160 and to a page index 170 that provides an index to the corpus to be searched (in some instances, the World Wide Web). Personalization database 166 and page index 170 may be implemented using generally conventional database technologies.

Trust network module 165 in one embodiment establishes a list of "friends" for each registered user of search server 160 and stores the lists in personalization database 166 The list of friends may be initialized automatically by trust network module 165 and edited by the user as described below, or it may be manually created. Based on the lists of friends established for various users, trust network module 165 defines, for each user, a trust network including that user's friends and, in some instances, friends of that user's friends and so on up to some limit as described below.

In some embodiments, trust network module 165 dynamically builds a trust network for each user; this includes generating a list of trust network members and associated parameters (e.g., trust weights or confidence coefficients as described below) for each member. Building of the trust network for a given user may occur in real time as trust network information is needed (e.g., when the user submits a query). Alternatively, a trust network for a given user may be built under predetermined conditions and stored for subsequent use. Examples of conditions that might trigger building (or rebuilding) of trust network information include: each time that user initiates a new session with search server 160; each time the user updates his or her list of friends as described below; or a regularly scheduled interval (e.g., daily).

Annotation module 164 in one embodiment interacts with personalization database 166 to store and manage user annotation data for various users of search server system 160. For instance, annotation data received from a user may be provided to annotation module 164 for storing in personalization database 166, and annotation module 164 may also respond to any requests for annotation data, including requests originating from query response module 162, other components of search server 160, and/or client 120.

Various interfaces may be provided for user entry of annotation data. Examples are described in above-referenced application Ser. No. 11/081,860; any of these or other interfaces may be used. When the user elects to annotate a page or site, user annotation module 164 receives the new annotation data from the user (e.g., via client system 120) and updates personalization database 166.

Query response module 162 in one embodiment references various page indexes 170 that are populated with, e.g., pages, links to pages, data representing the content of indexed pages, etc. Page indexes may be generated by various collection technologies including an automatic web crawler 172, and/or various spiders, etc., as well as manual or semi-automatic classification algorithms and interfaces for classifying and ranking web pages within a hierarchical structure. These technologies may be implemented in search server system 160 or in a separate system (e.g., web crawler 172) that generates a page index 170 and makes it available to search server system 160. Various page index implementations and formats are known in the art and may be used for page index 170.

Query response module 162 is configured to provide data responsive to various search requests (queries) received from a client system 120, in particular from search module 126. As used herein, the term "query" encompasses any request from a user (e.g., via client 120) to search server 160 that can be satisfied by searching the Web (or other corpus) indexed by page index 170. In one embodiment, a user is presented with a search interface via search module 126. The interface may include a text box into which a user may enter a query (e.g., by typing), check boxes and/or radio buttons for selecting from predefined queries, a directory or other structure enabling the user to limit search to a predefined subset of the full search corpus (e.g., to certain web sites or a categorical subsection within page index 170), etc. Any search interface may be used.

Query response module 162 is advantageously configured with search related algorithms for processing and ranking web pages relative to a given query (e.g., based on a combination of logical relevance, as measured by patterns of occurrence of search terms extracted from the query; context identifiers associated with search terms and/or particular pages or sites; page sponsorship; connectivity data collected from multiple pages; etc.). For example, query response module 162 may parse a received query to extract one or more search terms, then access page index 170 using the search terms, thereby generating a list of "hits", i.e., pages or sites (or references to pages or sites) that are determined to have at least some relevance to the query. Query response module 162 may then rank the hits using one or more ranking algorithms. Particular algorithms for identifying and ranking hits are not critical to the present invention, and conventional algorithms may be used.

In some embodiments of the present invention, query response module 162 is also configured to retrieve from personalization database 166 any annotation data associated with any user belonging to the querying user's trust network (including the querying user) and to incorporate such annotation data into the search results. Retrieval of annotation data may involve interaction between query response module 162 and trust network module 165, e.g., to obtain a list of trust network members, and/or between query response module 162 and annotation module 164, e.g., to retrieve the annotation data once the trust network members are identified.

Incorporation of annotation data can be done in a variety of ways. For example, where at least some of the annotations include ratings, hits can be identified and/or ranked based at least in part on the ratings information. Ratings given to hit pages or sites by individual trust network members may be used directly, or an aggregate (e.g., average) rating across all trust network members who rated a particular page can be used. In one embodiment, query response module 162 might generate a separate list of "favored" results based on favorable ratings for particular pages or sites; or query response module 162 might incorporate ratings for particular pages of sites in the ranking of search results; or query response module 162 might use unfavorable ratings by trust network members of particular pages or sites to determine whether to drop a hit from the listing of hits included in the search result page. Where the annotations include text descriptions, keywords or labels, the appearance of a search term in any of these elements may be considered during identification and/or ranking of search hits.

To enable search personalization features such as trust network annotations, search server 160 advantageously provides a user login feature, where "login" refers generally to any procedure for identifying and/or authenticating a user of a computer system. Numerous examples are known in the art and may be used in connection with embodiments of the present invention. For instance, in one embodiment, each user has a unique user identifier (ID) and a password, and search server 160 prompts a user to log in by delivering to client 120 a login page via which the user can enter this information. In other embodiments, biometric, voice, or other identification and authentication techniques may also be used in addition to or instead of a user ID and password. Once the user has identified herself, e.g., by logging in, the user can create and/or update annotations by interacting with user annotation module 164 as described below. Further, each query entered by a logged-in user can be associated with the unique user ID for that user; based on the user ID, query response module 162 can access personalization database 166 to incorporate annotations from members of the querying user's trust network into responses to that user's queries. User login is advantageously persistent, in the sense that once the user has logged in (e.g., via client application 125), the user's identity can be communicated to search server 160 at any appropriate time while the user operates client application 125. Thus, personalization features described herein can be made continuously accessible to a user.

In addition to using trust network members' annotations in responding to a query, query response module 162 may also use aggregate information gleaned from other users' annotations. For example, in one embodiment, a global aggregate rating (e.g., an average rating) for a page or site is computed from the ratings of every user who has provided an annotation with a rating for that page or site, regardless of trust network membership. This global aggregate rating can be used in selecting and/or ranking search hits. In another embodiment, global aggregate keywords or labels describing a page or site may be determined, e.g., by identifying those keywords or labels that have most frequently been applied to that page or site by the users who have annotated it, regardless of trust network membership. Such aggregate annotations for a given page may be stored, e.g., in page index 170, and used by query response module 162 to rank hits in response to a query, regardless of whether the user is known to search server 160.

In one embodiment, user annotation module 164 forwards new annotation data as it is received to an aggregator module (not shown in FIG. 2) that updates the aggregate annotation data stored in page index 170. Aggregate annotation data may be updated at regular intervals, e.g., daily or hourly, or approximately in real time. Collection and use of global aggregate annotation data is described in above-referenced application Ser. No. 11/081,860.

In still other embodiments, query response module 162 may be configurable to respond to a query by searching or reporting hits over a subset of the full corpus. For example, a user might be able to submit a query and request that only documents that have been annotated by members of her trust network be reported as hits. As another example, a user might be able to request that only documents that have been annotated by members of a certain community be reported as search hits. Examples of such operations are described below.

It will be appreciated that the search system described herein is illustrative and that variations and modifications are possible. The content server and search server system may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably. In addition, the query response module and user annotation module described herein may be implemented on the same server or on different servers.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of various page information). In addition, while the search server system is described as including a particular combination of component modules, it is to be understood that a division into modules is purely for convenience of description; more, fewer, or different modules might be defined.

In addition, in some embodiments, some modules and/or metadata described herein as being maintained by search server 160 might be wholly or partially resident on a client system. For example, some or all of a user's annotations could be stored locally on client system 120 and managed by a component module of client application 125. Other data, including portions or all of page index 170, could be periodically downloaded from search server 160 and stored by client system 120 for subsequent use. Further, client application 125 may create and manage an index of content stored locally on client 120 and may also provide a capability for searching locally stored content, incorporate search results including locally stored content into Web search results, and so on. Thus, search operations may include any combination of operations by a search server system and/or a client system.

In embodiments of the present invention, annotations can be collected from users in a variety of ways, including annotations entered from a search results page, annotations entered using a toolbar interface, and the like. Examples of collecting annotation data are described below.

C. Overview of Annotations

The annotation data stored in personalization database 166 can be collected from registered users of search server 160 via a variety of suitable interfaces. Some examples of annotation formats and interfaces for collecting annotations are described in above-referenced application Ser. No. 11/081,860 and are briefly summarized below. It is to be understood, however, that the present invention is not limited to particular annotation formats or annotation collection techniques.

1. Content of Annotations

As noted above, the term "annotation" is used herein to refer generally to any descriptive and/or evaluative metadata related to a page or site (or other content item in a corpus) that is collected from a user and thereafter stored in association with an identifier of that user and an identifier of the page or site. Annotations may include various fields of metadata, such as a rating (which may be any data indicating a favorable or unfavorable opinion) of the page or site, one or more keywords identifying a topic (or topics) of the page or site, a text description of the page or site, and/or other fields. For purposes of illustration, a specific annotation structure will now be described; it is to be understood that a particular annotation structure is not critical to the present invention.

As used herein, a "page" refers to a unit of content that is identifiable by a unique locator (e.g., a URL) and displayable by a suitably configured browser program. A "site" refers to a group of one or more pages related to common subject matter and located on the same server. In some embodiments of the invention, the user who creates an annotation can indicate whether that annotation should apply to a single page or to a group of related pages (a site). In the latter case, the user can advantageously define the scope of the site. In some embodiments, there is no difference between a page annotation and a site annotation other than the number of pages to which the annotation potentially applies.

In one embodiment, each annotation is a structured entry in personalization database 166. FIG. 3 illustrates content fields for an annotation 300. Fields in left column 302 can be automatically generated and updated by user annotation module 164; fields in right column 304 are preferably user-supplied.

The automatically generated fields include an "Author ID" field 306 that stores the user ID of the user who created (or saved) the annotation and a "URL" field 308 that identifies the page (or group of pages) that is the subject of the annotation. In this embodiment, the annotation is associated with the user whose ID appears in Author ID field 306 and with any document whose URL matches the URL stored in URL field 308. "Host flag" field 310 indicates whether the annotation applies to a page or to a group of pages. If the host flag is set to "page," the annotation applies only to the page whose URL exactly matches the string in field 308, whereas if the host flag is set to "site," the annotation applies to any page whose URL begins with the string shown in field 308. Thus, an annotation with host flag set to "site" could apply to any number of pages (including just one page). Host flag field 310 may be automatically set to a default value (e.g., "page"), and the user can be given the option to change the value.

"Title" field 312 stores a title for the subject page. This field is advantageously filled by default with a page title extracted from the annotated page's source code; in some embodiments, the user is allowed to change the title. "Abstract" field 314 stores a text abstract of the subject page or site; this abstract can be automatically generated or provided by the user.

The remaining fields in column 302 provide historical information about the annotation. For instance, "referral" field 316 provides contextual information about how the user arrived at the subject page. Referral field 316 might include, e.g., a query in response to which the user was led to the subject page (as shown in FIG. 3), historical information about what the user was viewing prior to navigating to the annotated page, or an identifier of another user from whom the author imported the annotation (importation is described below).

Where a user has annotated a page and later revised that annotation, referral field 316 is advantageously updated to identify a referral source that led to the revised annotation. "Old referral" field 318 can be used store contextual information related to the previous version of the annotation; this information would be similar to information stored in referral field 316. Any number of old referrals (including no old referrals) may be maintained.

"Last updated" field 320 provides a timestamp indicating when the user last updated the annotation. "Last visited" field 322 provides a timestamp indicating when the user last visited the annotated page. While FIG. 3 shows these timestamps in a YYYY-MM-DD HH:MM:SS format, it is to be understood that other formats and any desired degree of precision might be substituted. This information can be used, e.g., to identify older annotations as possibly being less reliable (especially where the annotated page has been updated more recently than the user's last visit to that page).

The fields in column 304 are supplied by the author and are advantageously left empty until and unless the user supplies data. In preferred embodiments, the user is not required to supply data for all of these fields, and any empty fields can be ignored when the annotation is used in search processing.

"Keywords" field 324 stores one or more user-supplied keywords or user-selected labels describing the subject page. As used herein, "keyword" (also sometimes referred to in the art as a "tag") refers to a word or short phrase provided by the user, who is free to choose any word or phrase, while "label" refers to a word or short phrase selected by the user from a system-defined vocabulary, such as a hierarchical list of category identifiers.

"Description" field 326 stores a user-supplied text description of the subject page. In populating this field, the user is not limited to words or short phrases or to any particular length, and the text may be formatted or unformatted. In some embodiments, description field 326 can store a fairly lengthy text string (e.g., up to 500 or 1000 words). The user may also be allowed to include links to other content as part of the description. Links could be included, e.g., to identify other sites that provide more detail about topics mentioned by the annotated page.

"Rating" field 328 stores a numerical value or other indicator reflecting the user's opinion or judgment of the subject page. Ratings may be provided using various scales, and the scale preferably allows at least "favorable," "unfavorable" and "neutral" ratings. For example, in one embodiment the user is prompted during creation of an annotation to give a favorable (e.g., thumbs-up) or unfavorable (e.g., thumbs-down) rating to the subject page. The favorable and unfavorable ratings are each assigned a numerical value (e.g., +2 and −2 respectively); unrated pages are given a default rating representing a "neutral" judgment (e.g., zero). Other rating systems, e.g., zero to four stars, a 1 to 10 rating, or the like, may also be used. The rating indicator stored in field 328 need not match the rating scale used by the user (e.g., if the user rates a page on a scale of 1 to 10, this could be translated to a rating indicator in the range from −4 to 5). Any pages the user annotates but does not rate are advantageously treated as having a neutral rating.

It is to be understood that annotation entry 300 is illustrative and that other annotation structures with different fields may also be used. For instance, in some embodiments, the annotation may include a representation of part or all of the content of the subject page in a compressed or uncompressed form. In other embodiments, the user can connect a description to a specific portion of the content of the subject page, and the portion to which the description is connected may be stored in the annotation. In another embodiment, search server 160 may also categorize pages or sites according to some taxonomy, and such category data may be saved as part of the annotation.

Other metadata related to the subject page (or site) may also be collected in the annotation record and automatically updated as the user continues to browse. For example, a counter might be provided to count the number of times the user visits a page or site she has annotated. The counter and/or the last-visited timestamp can be automatically updated each time the user visits the page or site. In some embodiments, only visits that occur while the user is logged in to search server 160 result in automatic updating.

Annotation entries may be formatted in any format suitable for storing in personalization database 166 (e.g., relational database schema, XML records or the like) and can be accessed by reference to various fields. In one embodiment, the annotation record is accessible by at least author ID, URL, title, and keywords.

2. Collecting Annotation Data

Annotations can be collected from users in a variety of ways, examples of which are described in above-referenced application Ser. No. 11/081,860. As described therein, a user can elect to annotate any page displayed in a Web browser client equipped with a suitable toolbar, or the user can elect to annotate a page that appears in a list of search hits.

In embodiments of the present invention, any suitable techniques can be used for collecting descriptive and/or evaluative metadata about a page (or group of pages) from a user and associating that metadata with the user who provided it and with the subject page (or group of pages). As each user visits and annotates various pages or sites, each user builds up a personal "library" of content that is of interest to that user, and each user can view and edit her own library, e.g., as described in above-referenced application Ser. No. 11/081,860.

3. Organization of Annotations

In some embodiments, users can organize their annotations using folders. For example, each user may have a "Main" folder, into which that user's new annotations are placed by default. The user may create additional folders as desired. In some embodiments, the user may also define subfolders within folders. User interfaces for creating and managing folders may be of generally conventional design.

Figure 4:
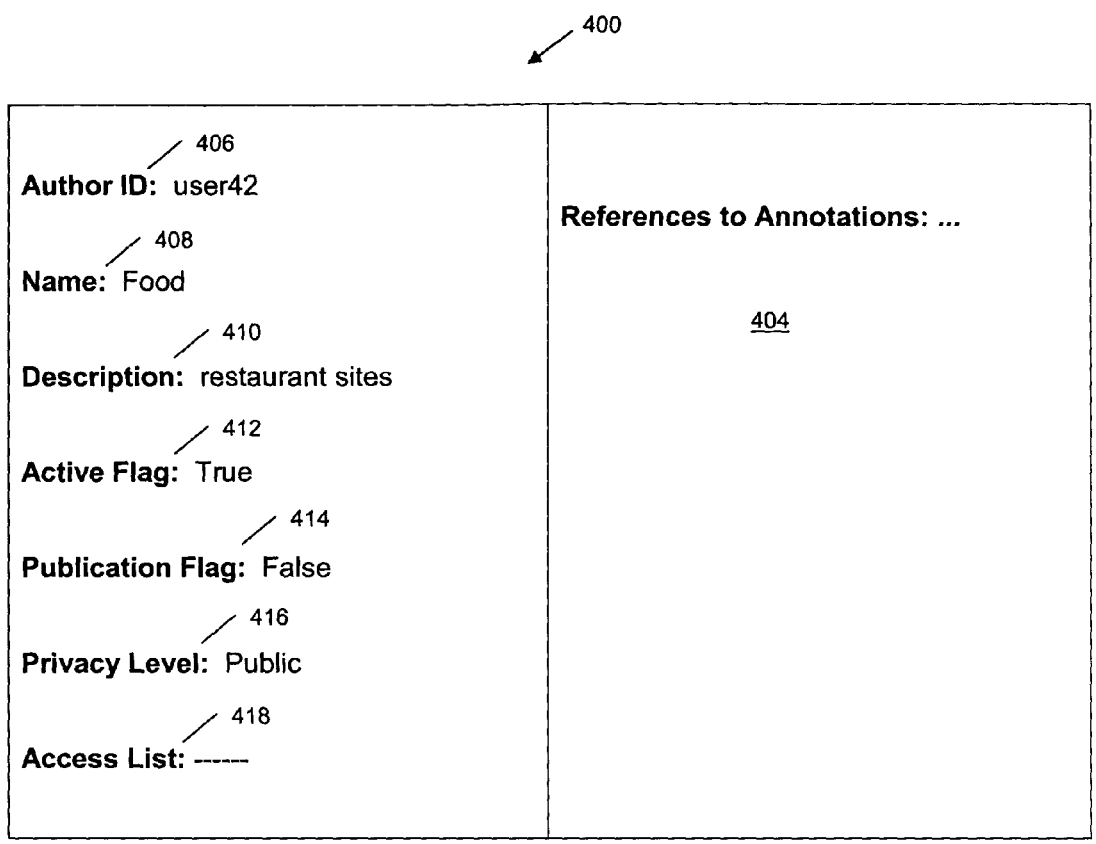
FIG. 4 is an example of a folder entry for organizing annotations according to an embodiment of the present invention.

In one embodiment, each folder is defined using a folder entry in personalization database 166. FIG. 4 illustrates a folder entry 400 according to an embodiment of the present invention. Folder entry 400 includes a references field 404 that provides references (e.g., persistent pointers) to the annotations and/or subfolders belonging to folder 400; a linked list or other suitable data structure may be used to implement references 404.

Folder entry 400 also advantageously includes other fields usable for folder management. In one embodiment, those fields include an "Author ID" field 406 that stores the user ID of the user to whom the folder belongs and a "Name" field 408 that stores a user-supplied folder name (e.g., with an upper limit of 80 characters). "Name" field 408 may default to "New Folder" or some other suitable string. "Description" field 410 stores a user-editable free text description of the folder's purpose or content; this field may default to an empty state. "Active" field 412 stores a flag (e.g., a Boolean value) indicating whether the annotations in that folder should be used in responding to queries.

"Publication flag" (field 414), "Privacy level" field 416, and "Access List" field 418 all relate to sharing of annotations, which in some embodiments can be controlled on a per-folder basis. The publication flag in field 414 indicates whether annotations in folder 400 should be automatically distributed to other users via a publication mechanism; publication is described below. The privacy level in field 416 and access list in field 418 are used to control the extent to which annotations in the folder should be viewable by other users. Examples of privacy levels and their significance are described below.

It will be appreciated that folder formats may vary and that other fields may be included. With the exception of the "Main" folder, the user may freely create, rename, and delete folders. In some embodiments, multiple folders can store a reference to the same annotation; in other embodiments, each annotation is assigned to exactly one folder at a time, and users can move annotations from one folder to another or create a copy of an annotation in a different folder. In some embodiments, each annotation entry may also include a "folder ID" field that stores a reference back to the folder(s) to which the annotation is assigned.

While folders are optional, providing folders allows an additional degree of user control over the search experience. For example, a user can arrange her annotations in multiple folders, with the active flag (field 412) set to true for one or more of the folders and to false for others. When the user enters a query, only judgments in the active folder(s) would affect the results. The user may also use folders to collect and organize annotated pages in a manner somewhat similar to bookmarks or other personal site lists supported by various Web browser programs or Internet portal services. In preferred embodiments, the folders and annotation data described herein are maintained for the user by search server 160 and can be made available to the user regardless of the location from which she accesses search server 160.

In another embodiment, folders are not used, and use of annotations is instead managed based on the user-supplied keywords or labels in the annotation records. For example, the active flag, publication flag, and/or privacy settings may be defined per keyword rather than per folder.

II. Sharing of Annotations via a Trust Network

As described in above-referenced application Ser. No. 11/081,860, each user's collected annotations can be made available to that user as she browses the Web. For instance, while the user is viewing a site she has annotated, she may be able to view and/or edit her annotation as well. As another example, search results pages may include visual or other highlight elements to identify hit pages that the user has annotated or may report metadata extracted from the user's annotations for various hit pages. As yet another example, the user's annotations may be used in addition to or instead of page content and other conventional factors to identify and/or rank search hits.

In embodiments of the present invention, users can also view annotations created by other users in addition to their own annotations. The set of users whose annotations are to be viewed by a first user is referred to herein as the first user's "trust network," and in preferred embodiments, each user may exercise at least some degree of control over the membership of her trust network. Examples of techniques for defining a trust network for a user will now be described.

A. Creation of Trust Networks

1. Social Network Model

In some embodiments, a trust network for a user is defined based on a social network built from trust relationships between various pairs of users. Each user can explicitly define trust relationships to one or more other users (referred to herein as "friends" of the first user). Based on various users' trust relationships, a social network connecting users to other users via trust relationships can be defined, and a portion of the social network emanating from a given user can be defined as the trust network for that user. In such embodiments, the trust network for a given user generally includes, in addition to the user herself, the user's friends and can also include friends of the user's friends, and so on. In some embodiments, all trust relationships are mutual (i.e., users A and B are friends only if both agree to trust each other); in other embodiments, one-way trust relationships can also be defined (i.e., user A can have user B as a friend regardless of whether user B has user A as a friend). Any user can define as a friend any other user whose annotations the first user believes to be of value to her.

Figure 5:
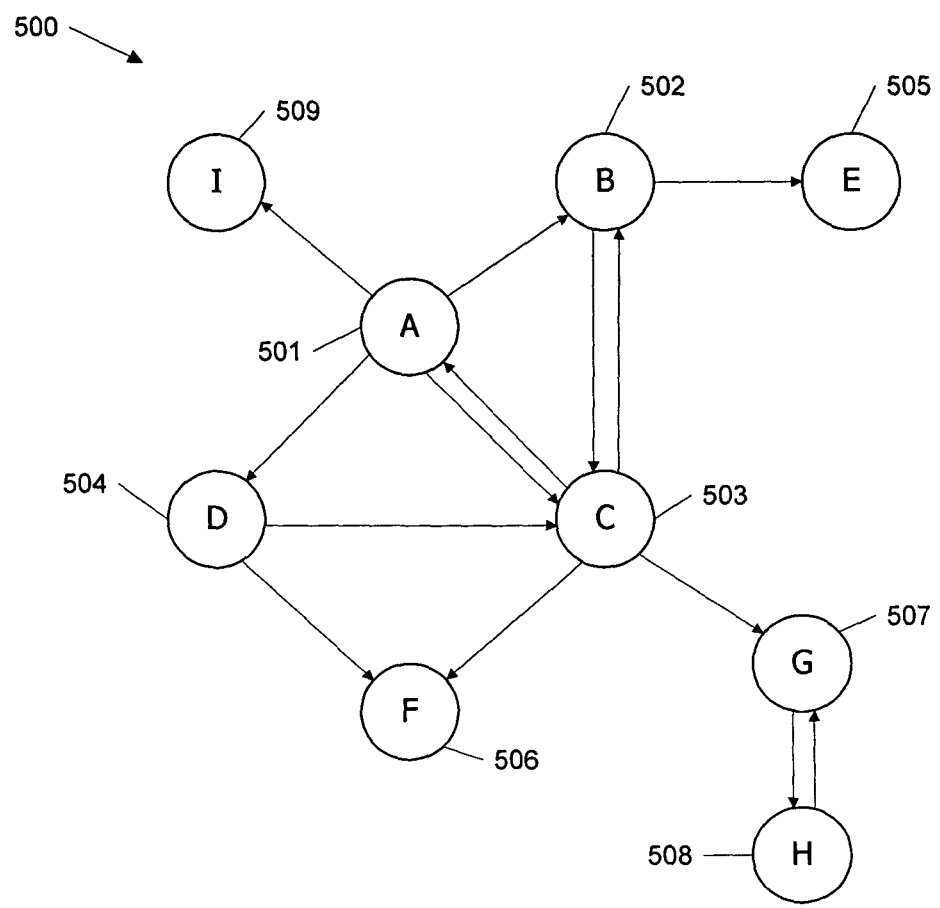
FIG. 5 is a network graph for a trust network according to an embodiment of the present invention.

From the trust relationships defined by various users, a "social network" can be built up, and all or part of the social network can be selected as the trust network for a given user. In general, a social network can be represented by a network graph 500, e.g., as shown in FIG. 5. The network graph 500 includes nodes 501-509, each of which represents a different user (users in this example are identified by letters A-H). The edges (arrows) connecting pairs of nodes represent trust relationships between the users; thus, user A trusts users B, C, D and I; user B trusts users C and E, and so on. In this example, the trust relationships are unidirectional; a bidirectional trust relationship (e.g., between users A and C) is represented using two edges. It is to be understood that network graph 500 is illustrative. A social network may include any number of users and any number of trust relationships, and one user may define trust relationships to any number of other users; trust relationships may be unidirectional or bidirectional.

In one embodiment of the present invention, user A is able to view her own annotations as well as annotations created by any of her friends. In another embodiment, user A may also be able to view annotations created by her friends' friends. For example, there is not a direct trust relationship between user A and user E. However, user A trusts user B, who in turn trusts user E. Thus, user A can be said to have an "indirect" trust relationship to user E, and annotations from both users B and E might be made visible to user A.

More generally, the present description refers to trust relationships with N degrees of separation, where N is an integer is equal to the minimum number of edges connecting the users in the social network. N=1 corresponds to a direct trust relationship (e.g., the relationship between users A and B); N>1 corresponds to an indirect trust relationship. For purposes of the present description, user A can be regarded as member of her own social network, with N=0. In some embodiments of the present invention, a user (e.g., user A) browsing the Web can view and edit her own annotations and can also view (but not edit) annotations created by other users in her social network up to some maximum degree of separation (e.g., N=1, 2, 3 or more).

In some embodiments, user A may assign different "trust weights" to each of her trust relationships. Trust weights may be defined on various scales, e.g., an integer from 1 to 10 or the like. Trust weights advantageously reflect the relative amount of confidence user A has in the annotations of each of her friends; in general, a higher trust weight reflects a higher degree of confidence.

Where trust weights are defined, this information can also be used in defining the trust network. For instance, a trust propagation algorithm can be used to assign a "confidence coefficient" p to users in the social network; the confidence coefficient $p_{XA}$ for a user X relative to user A is generally based on the trust weight user A has assigned to her friends, the trust weights that user A's friends have assigned to their friends and so on. Examples of trust propagation algorithms are known in the art and may be used to generate confidence coefficients. Confidence coefficients for other users relative to user A can also be determined based on degree of separation, e.g., by assuming an equal trust weight for each of user A's friends, then using a trust propagation algorithm to determine the confidence coefficients for each trust network member, or by assigning an equal confidence coefficient to each user at a given degree of separation from user A. In one embodiment, membership in user A's trust network is limited to users X whose confidence coefficient $p_{XA}$ exceeds some threshold, regardless of their degree of separation from user A. Other uses of trust weights and confidence coefficients are described below.

2. Explicit Identification of Friends

In one embodiment, trust network module 165 (FIG. 2) provides an interface by which one user (e.g., user A) can explicitly identify other users as her friends for purposes of defining her trust network. This interface might include a Web page that is served to a user on request, and the user is advantageously required to log in to search server 160 before receiving the interface page.

Figure 6:
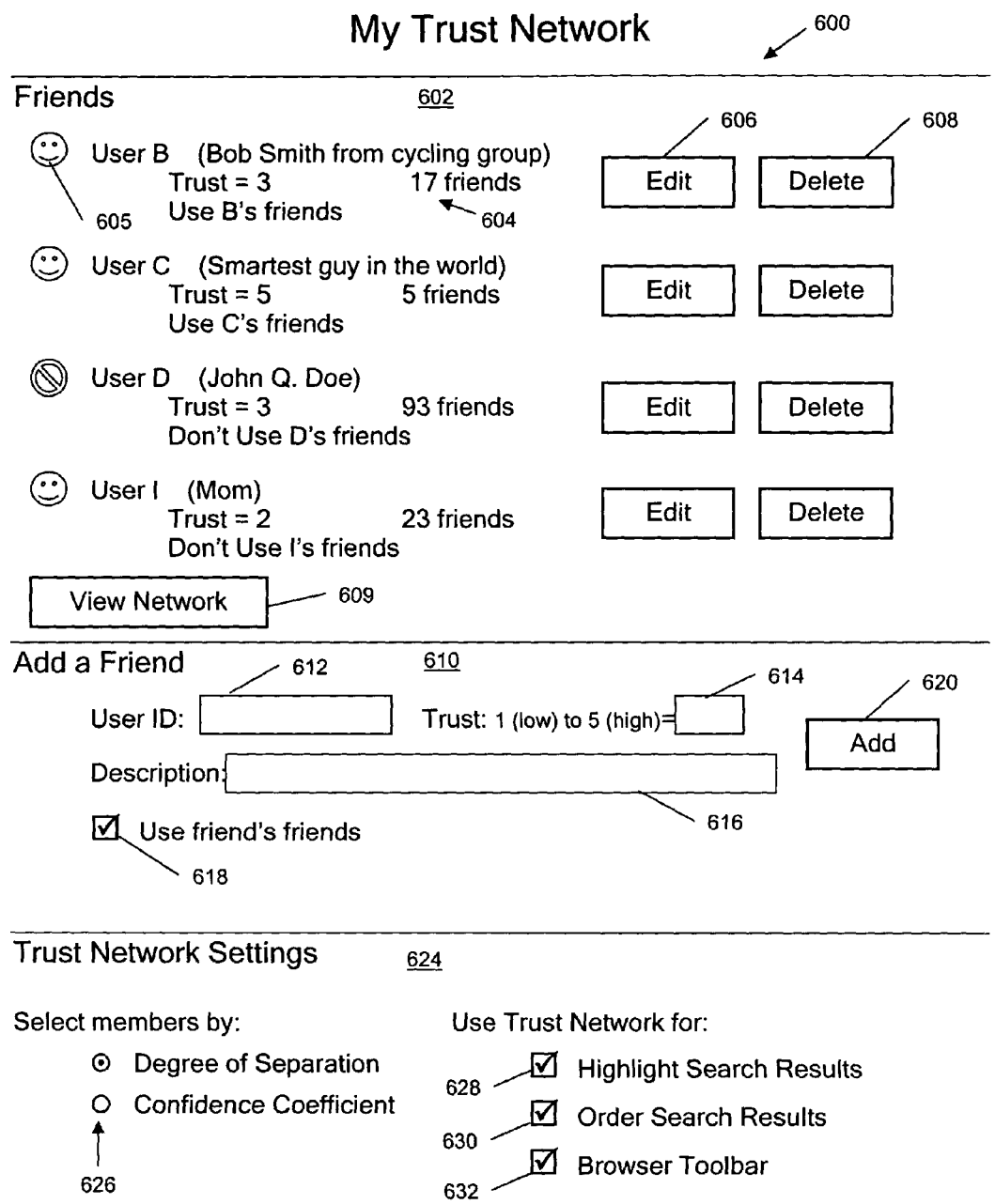
FIG. 6 is an example of a trust network interface page according to one embodiment of the present invention.

FIG. 6 is an example of a trust network interface page 600 according to an embodiment of the present invention. Page 600 provides various mechanisms for a user (e.g., user A) to view and modify a list of her friends for purposes of defining a trust network using a social-network model. The current list of user A's friends is displayed in section 602. For each friend, a list entry 604 includes the user ID, a description, and a trust weight. The description field can be populated by user A with any information desired, such as the friend's real name, relationship to user A, etc. Section 602 may be implemented to support sorting by any of its fields and may include other information about each friend, such as the number of friends each friend has or a timestamp (not shown) indicating when the friend was added to the list. Information for populating list 602 can be stored, e.g., in appropriate records in personalization database 166, and retrieved by trust network module 165 in response to a user request.

Other information might also be provided. For example, in some embodiments, each entry 604 in section 602 includes an "Active" flag 605 that indicates whether the friend is to be included (smiley icon) or disregarded ("not" icon) in user A's trust network. This allows user A to disregard a friend's annotations without removing the friend from the list. For example, the same list of friends for user A might also be used in another social networking context, and user A might want another user (e.g., user D) to be on her friends list in the other context but not for purposes of viewing annotations. In some embodiments, user A may also be able to choose whether to include (use) or ignore (don't use) annotations from each friend's friends, and the entry 604 may show this information.

Each entry is accompanied by an "Edit" button 606 and a "Delete" button 608. Activating button 606 opens a dialog box (or form page) via which user A can update any of the information about the friend, then save or cancel the changes. Activating button 608 removes the friend from user A's list.

A "View Network" button 609 is also provided. Activating button 609 launches an interactive display of user A's trust network, including her friends and also friends of her friends out to a maximum degree of separation, minimum confidence coefficient, or other limiting parameter for defining the trust network. The display advantageously includes all users who would be in user A's trust network (i.e., all users whose annotations would be made visible to user A) and may also show users (e.g., user D) whom user A has blocked from her trust network.

In one embodiment, the display includes a network graph similar to FIG. 5, and the graph or other display may be editable. For example, user A may be allowed to delete a node, thereby indicating that the user represented by that node should be excluded from her trust network. In one embodiment, the case where the node represents a friend of user A (e.g., if user A as the editing user were to delete node 504), deleting the node removes the friend (e.g., user D) from user A's list of friends; in another embodiment, deleting the node simply sets the "Active" flag 605 for that friend to the inactive state. Where the node is a friend of a friend (any node with a degree of separation greater than 1 from user A), deleting the node has the effect of blocking that user's annotations from being visible to user A but does not change any trust relationships. Instead, a special entry identifying a particular user as "blocked" is advantageously added to the list of friends maintained for user A in personalization database 166. For instance, if user A as the editing user were to delete node 507, user G would cease to be a member of user A's trust network, but the trust relationship between user C and user G would be unaffected and user G would remain in user C's trust network. Thus, user A can tune her trust network by selectively blocking individual members whose annotations user A finds unhelpful. In some embodiments, blocking a member also has the effect of blocking other members who are connected to the trust network only via the blocked member.

Referring again to FIG. 6, page 600 also includes a section 610 via which user A can add a new friend. User A enters the new friend's user ID in a text box 612, a description in a text box 614 and a trust weight in a box 616. In some embodiments, the trust weight may have a default value (e.g., 3 on a scale of 1 to 5). User A may also elect, via a check box 618, whether to include the new friend's friends in her trust network. Activating an "Add" button 620 completes the operation, and the listing in section 602 is advantageously refreshed to include the new friend.

Once defined, user A's list of friends is stored in association with other user specific information for user A, e.g., in personalization database 166. This information can then be accessed and used to personalize or customize responses to that user's queries.

It will be appreciated that the interface described herein is illustrative and that variations and modifications are possible. For example, in some embodiments, a new friend can be added only if the friend consents to be added. Thus, activation of Add button 620 by user A might not immediately add any friends to user A's list. Instead, an invitation might be sent to the user named by A (e.g., user K) via e-mail, instant message, or other suitable communication medium, and user K can respond with an indication as to whether he accepts the invitation. If user K accepts, a bidirectional friendship between users A and K would be established, e.g., by adding each user to the other's list of friends; if not, then no new friendship would be established.

3. Automatic Identification of Friends

In some embodiments, trust network module 165 can also automatically generate a list of friends for user A by mining various sources of information to identify other users with whom user A has voluntary contact.

For example, in one embodiment, the provider of search server 160 also provides communication services such as e-mail, IM (instant messaging), and the like. As is known in the art, such services may allow user A to maintain a list of users with whom A desires to have contact. For example, if user A is registered with the provider's IM service, user A can define a "friend" list (also sometimes called a "buddy" list), which is a list of user identifiers for other registered users with whom user A wants to exchange instant messages. The inclusion of user B (or any other user) on user A's IM friend list indicates a connection from user A to user B and suggests that user B might be a friend of user A. Similarly, if user A is registered with the provider's e-mail service, user A might maintain a personal e-mail address book that identifies users with whom user A exchanges e-mail. The inclusion of user C (or any other user registered with search server 160) in user A's address book would also indicate a connection from user A to user C and suggests that user C might be a friend of user A.

In still another embodiment, the provider of search server 160 also allows registered users to join online communities whose members can communicate with each other using bulletin boards, chat rooms, e-mail distribution lists, or the like. If two users (e.g., A and B) are both members of the same online community, it can be inferred that there is a connection between the users and a bidirectional friendship might be appropriate.

Any or all of these techniques can be used to automatically populate a list of friends for a user. In some embodiments, the user's list of friends can be pre-populated using any of the above or other sources of relationship information, and the user can then edit the list, e.g., via page 600 as described above. Where a relationship is automatically defined, page 600 advantageously indicates (e.g., in the description field) the source from which the relationship was inferred and may also indicate that the relationship was automatically defined. In embodiments where mutual consent is required to establish a friendship, any source of relationship data could be mined and used as the basis for issuing invitations to various pairs of users to become friends, with relationships being established whenever both users accept.

In other embodiments, the user's list of friends is not pre-populated by default, and the user can select which, if any, sources of relationship information (e.g., an IM friend list and/or an e-mail address book and/or community membership information) should be used to automatically populate the list. Thereafter, the user can edit the list.

4. Selection of Collections of Friends

In other embodiments, trust networks are defined based on implicit trust relationships among well-defined groups or communities of users. As used herein, a "community" refers to any ongoing forum for which search server 160 can obtain a list of user IDs of the members and associate those IDs with authors of annotations. Typically (but not necessarily), a community uses at least one network-based communication medium managed by a provider of search server 160, such as a subscription-based e-mail distribution list, a members-only chat room, a bulletin board or the like. In one embodiment, the communities correspond to Yahoo! Groups, but any other online communities whose members' identities can be determined by search server 160 might be used; more generally, any organization or forum that provides a well-defined membership list can be used as a community as long as search server 160 can map the user identifiers in the membership list to user identifiers of participants in the annotation system.

In some embodiments, user A's trust network is defined as including all users who are currently members of a community to which user A belongs. In some embodiments, user A may be able, via a suitable interface (not shown in FIG. 6), to select one or more of the communities of which she is a member to be used as her trust network. Some embodiments might allow user A to view and edit a personal list of friends derived from the list of community members for the selected community (or communities), e.g., as described above, but it is not required that user A be able to edit or even to view a list of community members. Thus, user A can select any community to which she belongs as her trust network, even without having information as to who the other members of that community are, and the membership of user A's trust network may change automatically, with or without user A's knowledge, as members join and leave the selected community.

Where the trust network for user A is defined by reference to a community, user A may be able to block annotations from individual members, effectively removing them from her trust network. For example, when an annotation by a trust network member is displayed, the display interface may include a control via which user A can instruct search server 160 to block the author's annotations in the future. In such embodiments, personalization database 166 may include, for each user, a listing of the community (or communities) to be used to define the user's trust network and a "blacklist" of users whose annotations should be blocked.

Where user A's trust network is defined by reference to a community, all community members can be treated as having the same degree of separation (e.g., N=1) from user A. In some embodiments, all members are also initially assigned an equal trust weight, and user A might or might not be able to manually adjust the trust weights of individual members via a suitable interface (e.g., similar to page 600 described above).

In other embodiments, each community member can be assigned a "reputation score" within the community, and the reputation score for a given member can be used as a confidence coefficient for that member. Reputation scores can be determined in various ways. In one embodiment, a community member's reputation score is based on his or her level of participation in the community (e.g., frequency of posting to a bulletin board or e-mail distribution list or of participation in a chat room, etc.). In another embodiment, community members may be able to explicitly rate other members' reliability, and the reputation score for each member can be based on such ratings (see, e.g., Section IV.C, below). In still another embodiment, members of the community might be able to rate (but not edit) other members' annotations, and a member's reputation score could be based on the ratings given to his or her annotations by other members of the community.

5. User Preferences for Trust Networks

In some embodiments, trust network module 165 allows each user to specify various parameters related to how her trust network should be defined and how it should be used. For example, in page 600 of FIG. 6, section 624 allows the user to control settings for the trust network. For instance, using radio buttons 626, the user can indicate whether trust network membership should be determined based on degree of separation or confidence coefficient. In some embodiments, the user might also be able to specify a maximum degree of separation within some range (e.g., $N_{max}$=1, 2, or 3) or a minimum confidence coefficient (e.g., $p_{min}$=0.2, 0.4, or 0.8). Checkboxes 628, 630 and 632 allow the user to specify the situations in which information obtained from her trust network should be displayed. For example, the user can choose to whether to have search results highlighted and/or ordered based on information obtained from her trust network (boxes 628, 630), as well as whether the browser toolbar should indicate whether a displayed page has been annotated by someone in her trust network (box 632). Examples of such operations are described below.

It will be appreciated that other user preferences and combinations of preferences might be supported. For example, the user might be able to specify whether her trust network should be built from a social network model using an explicit list of friends or implicitly from a community to which she belongs.

B. Toolbar Interface to Trust Network Annotations

Figure 7:
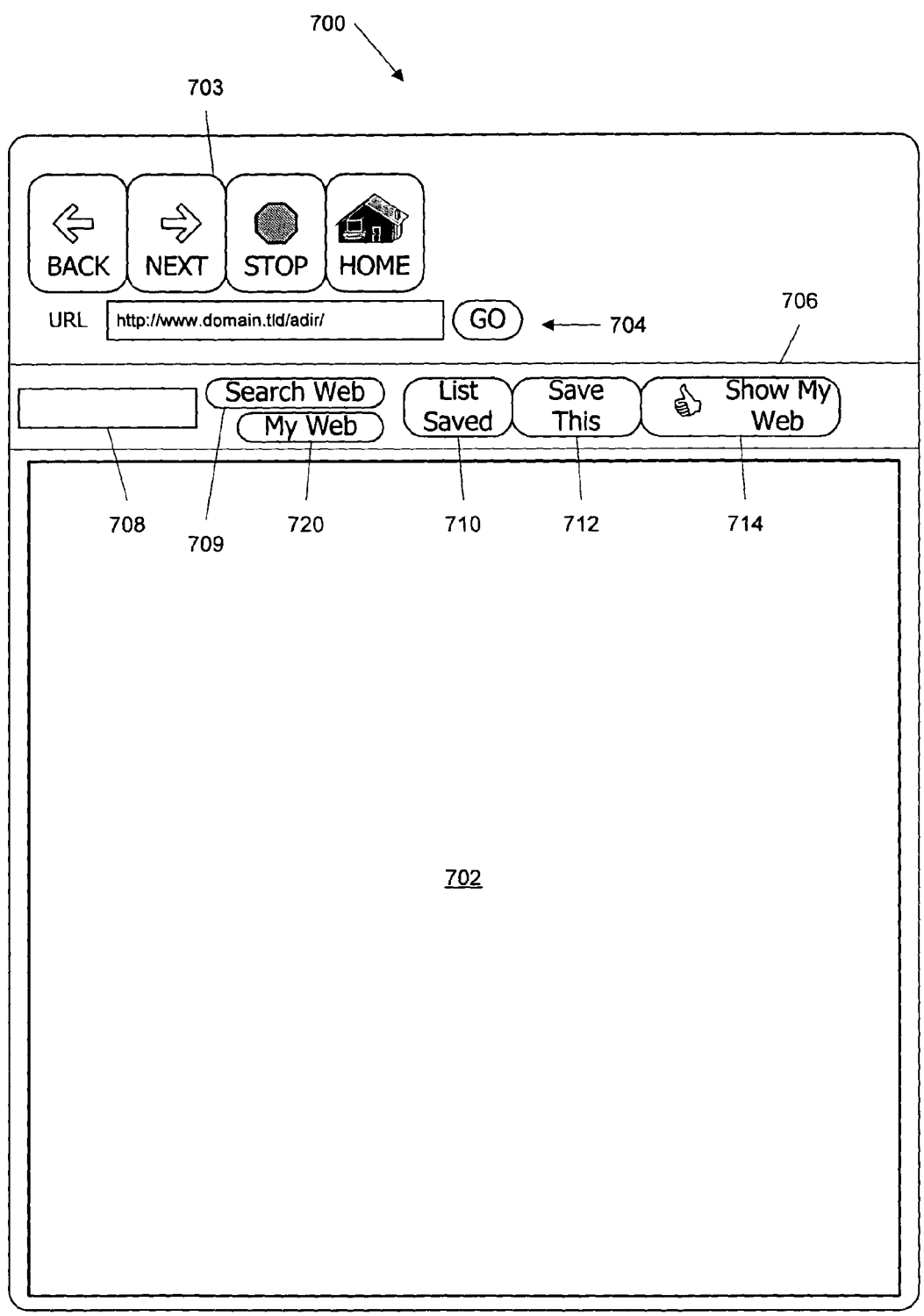
FIG. 7 is an example of a toolbar-based interface for annotating and/or viewing existing annotations for any page the user happens to be viewing according to an embodiment of the present invention.

FIG. 7 is an example of a toolbar-based interface for annotating and/or viewing existing annotations by trust network members for any page the user happens to be viewing according to an embodiment of the present invention. A Web browser window 700 includes conventional elements such as a viewing area 702 for displaying Web content, a default toolbar 704 that provides navigation buttons (back, forward, and the like), and a navigation area 704 that shows the URL of the currently displayed page and also allows the user to enter a URL for a different page to be displayed in viewing area 702. Browser window 700 also includes a search toolbar 706 that may be provided as an add-in to a conventional browser program or as a standard feature of a browser program.

Search toolbar 706 advantageously includes a text box 708 and "Search Web" button 709 via which the user can submit queries to search server 160 (FIG. 2), a "List Saved" button 710 allowing the user to view her own saved annotations and to navigate to pages she has annotated, and a "Save This' button 712 that opens a page or dialog box allowing the user to annotate the currently displayed page. These aspects of search toolbar 706 may be generally similar to features described in above-referenced application Ser. No. 11/081, 860. As used herein, "saving" a page refers to creating and storing an annotation for the page and might or might not include saving a copy of the page content.

In some embodiments, search toolbar 706 also includes a "Show My Web" button 714 that appears in an active state whenever the browser is displaying a page that the browsing user or another member of her trust network has previously annotated; the browsing user can operate button 714 to view previous annotations entered by any member of her trust network. Where the annotations include ratings, the appearance of button 714 may depend in part on ratings given to the currently displayed page by trust network members. For example, an average rating across all trust network members might be reflected by an icon included in button 714). In preferred embodiments, button 714 is only operable when the currently displayed page has been annotated by at least one member of the user's trust network.

Figure 8:
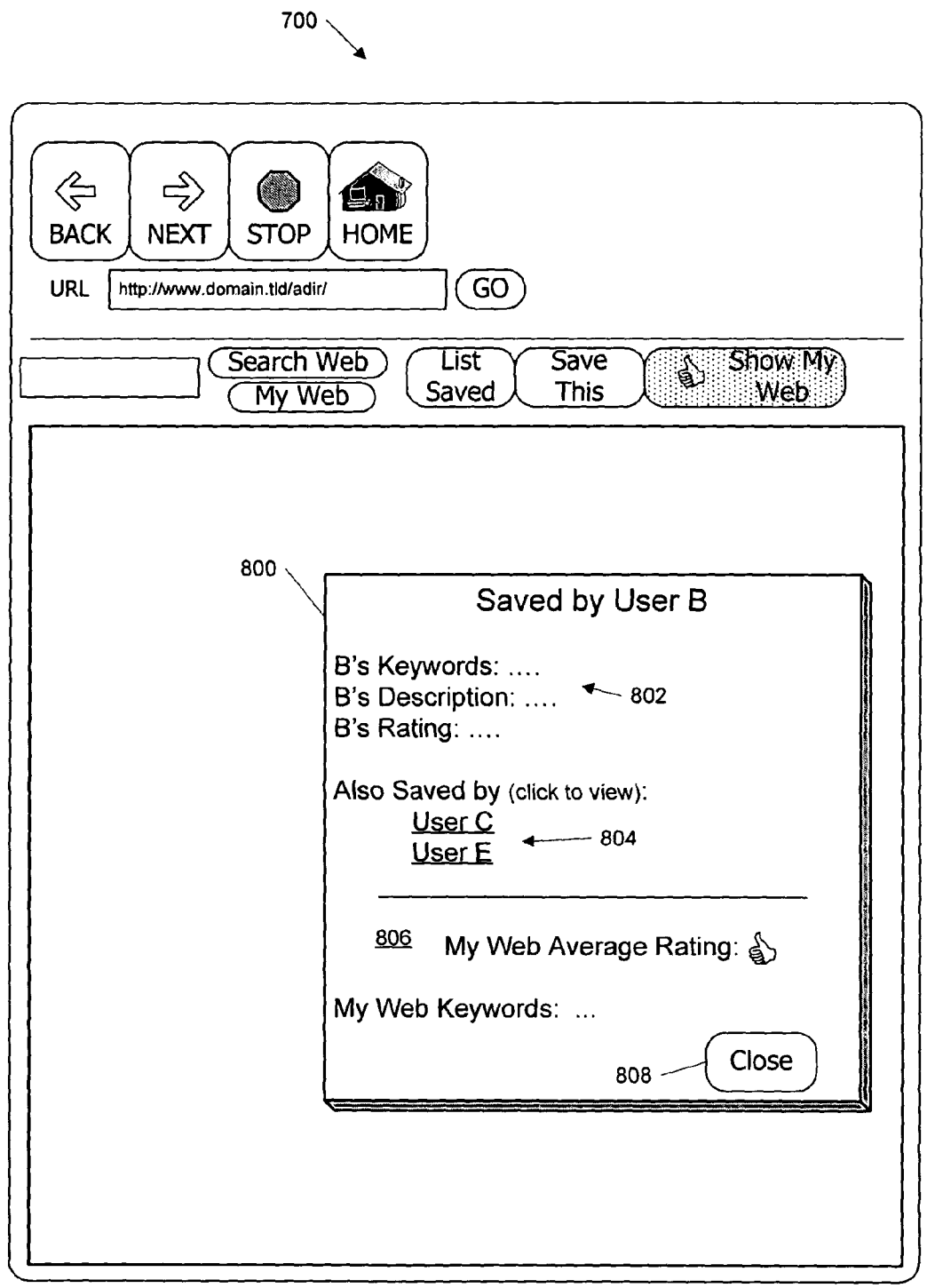
FIG. 8 is an example of an overlay for displaying an annotation according to an embodiment of the present invention.

FIG. 8 illustrates a dialog box or overlay 800 that may be launched when button 714 is activated. Overlay 800 provides annotation information about the currently displayed page, based on annotations from members of the browsing user's (e.g., user A's) trust network. In section 802, metadata from the annotation saved by the "closest" member of user A's trust network is displayed.

The "closest" member may be defined in various ways. In one embodiment, closeness is based primarily on degree of separation (N) so that the trust network member with the smallest N relative to user A is defined as closest. (Note that since user A is by definition the only member of A's trust network with N=0, if user A has annotated the page, user A's own annotation would be displayed in section 802.) Where defining the closest user by reference to N results in a tie, other parameters (e.g., trust weight, confidence coefficient, or how long the relationship has existed) can be used to determine which member is closest. In another embodiment, confidence coefficients might be used to define closeness, with other parameters (e.g., degree of separation) being used to break ties. It will be appreciated that a particular definition of "closest member" is not critical to the present invention.

Below section 802 is a list 804 of other trust network members who have annotated the displayed page. A clickable link for displaying each such member's annotation is advantageously provided. In preferred embodiments, the browsing user is not allowed to edit annotations entered by other users but may be allowed to edit her own annotations (e.g., by including in overlay 800 an "Edit" button that launches an editing interface, with the "Edit" button being operable only when the browsing user's own annotation is displayed in section 802).

Section 806 provides metadata aggregated over the browsing user's trust network. In one embodiment, the aggregated metadata include an average rating for the page or site and a list of keywords describing the page or site. The average rating can be computed, e.g., by computing a weighted average of ratings, with each trust network member's rating being weighted by the confidence coefficient for that member relative to the browsing user. (For purposes of computing an average rating, any trust network members who did not annotate the page are advantageously ignored.) A list of keywords can be generated by identifying the most frequently occurring keywords in the annotations of all trust network members; each keyword's frequency of occurrence can be computed by adding the confidence coefficients of the trust network members who used that keyword. In other embodiments, the aggregation algorithms may also take into account other factors such as recency of a given annotation (with less recent annotations receiving lower weight), or the like.

"Close" button 808 closes overlay 800, which can be reopened at any time by activating button 714.

It will be appreciated that the toolbar interface described herein is illustrative and that variations and modifications are possible. Search toolbar 706 may also include other components in addition to or instead of those shown. In addition, any other persistent interface (i.e., an interface accessible while the user is viewing any Web page) may be substituted; a search toolbar is not required. In alternative embodiments, the interface element that notifies the browsing user of the existence of annotations might deliver other information. For instance, the interface element might identify the closest trust network member who has annotated the page and/or indicate the number of trust network members who have annotated the page. Such information could also be included in overlay 800. The element might also indicate whether the closest member is the browsing user or another user. Annotation data need not be displayed in an overlay; a dialog box, a new browser window, a new tab in an existing browser window, or the like could also be used, or annotation data could be added inline to the page. Alternatively, the current browser window could be redirected to a page containing the annotation data.

In some embodiments, search toolbar 706 can be configured such that it is usable in a "generic" state by users who are not logged in to search server 160 and in a "personalized" state by users who are logged in. In the generic state, the toolbar provides access to basic search services (e.g., via text box 708 and "Search" button 709) and a button allowing the user to log in for access to personalized services. In the personalized state, personalization features can be supported through the toolbar. For instance, "Save This" button 712 might be provided only in the personalized state of toolbar 706; alternatively, button 712 might also be provided in the generic state, with the browser being redirected to a log-in page if button 712 is activated while the toolbar is in the generic state.

C. Search Report Interface to Trust Network Annotations

Figure 9A:
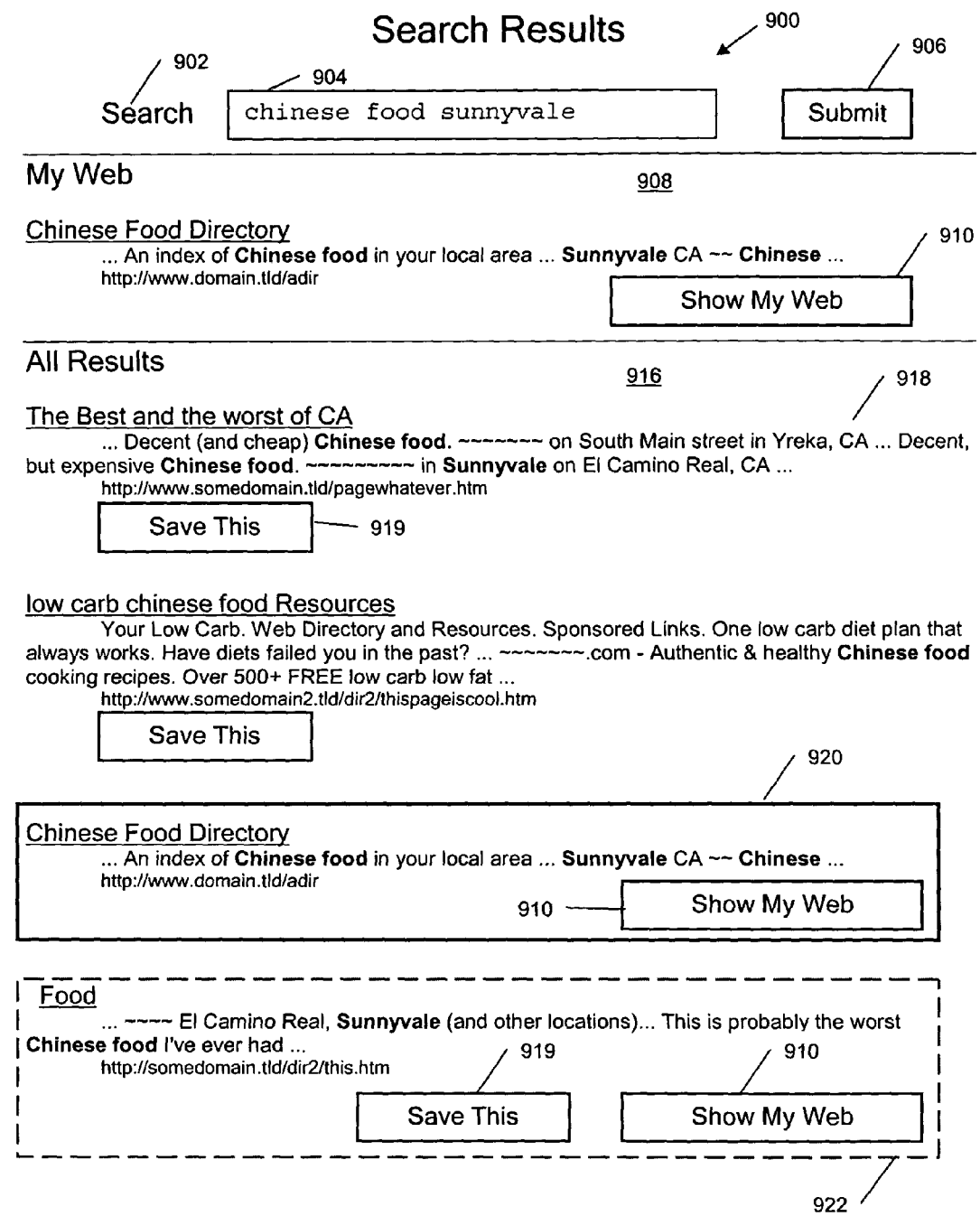

In some embodiments, the existence of annotations by a user's trust network members may be included in pages reporting search results for queries entered by that user. FIG. 9A is an example of a search results page 900 enhanced with annotation information according to an embodiment of the present invention. Results page 900 might be generated by query response module 162 in response to a user's query. In this embodiment, results page 900 includes a banner section 902. In addition to page identifying information, banner section 902 includes a search box 904, which shows the current query (e.g., "chinese food Sunnyvale") in editable form together with a search button 906 enabling the user to change the query and execute a new search. These features may be of generally conventional design.

Section 908 is a personalized ("My Web") results area, in which any hits that members of the querying user's trust network have previously annotated are displayed. In some embodiments, section 908 may show only hits for which the trust network's aggregate rating (e.g., as described above with reference to FIG. 8) is favorable; in other embodiments, all annotated hits may be listed in section 908. Each annotated hit is advantageously accompanied by a "Show My Web" button 910 that the user can activate to view the members' annotations. In one embodiment, activating button 910 launches an overlay similar to overlay 800 of FIG. 8 described above.

"All Results" section 916 displays some or all of the hits (including both annotated and unannotated hits) with a ranking determined by query response module 162. Conventional ranking algorithms may be used to generate this ranking. Each entry 918 in section 916 corresponds to one of the hits and includes the title of the hit page (or site) and a brief excerpt (or abstract) from the content of that page. Excerpts or abstracts may be generated using conventional techniques. The URL (uniform resource locator) of the hit is also displayed. For hits that no trust network member has annotated, a "Save This" button 919 may be displayed, and while viewing page 900, the user may elect to annotate an unannotated hit by activating a button 919. "Save This" button 919 is advantageously similar in operation to button 712 in FIG. 7 above.

Any annotated hits in section 916 may be visually highlighted to indicate the existence of the annotation and may also include a "Show My Web" button 910. Also, for each hit where other members of the querying user's trust network have annotated the hit but the querying user has not, a "Save This" button 919 might also be provided.

Various designs for highlighting annotated hits may be used, including, e.g., borders, shading, special fonts, colors or the like. In some embodiments where the annotations include ratings, the type of highlighting depends on the aggregate rating across the trust network, and the aggregate rating may also be displayed on page 900. For example, hit 920 has a favorable rating while hit 922 has an unfavorable rating. In other embodiments, other aggregate metadata and/or metadata from individual members of the trust network could be included on page 900.

In other embodiments, more information than just highlighting might appear on the search results page. FIG. 9B is an example of another search results page 940 that provides excerpts from the comments made by trust network members in "My Web" section 948. Each hit 950 is accompanied by comments 952 extracted from annotations by trust network members. In this embodiment, two comments are shown; additional comments or more information about the annotations can be viewed by clicking "More" buttons 954. Where the querying user has not annotated the hit, a "Save This" button 956 may be provided. Search results page 940 may also include an "All Results" section (not shown) and other information.

It will be appreciated that the search result pages described herein are illustrative and that variations and modifications are possible. Any search report in any format suitable for transmission to a user may be substituted for search result page 900, and the various interface control elements for interacting with the search report may be varied from those shown herein. Any portion (including all) of annotation metadata may be included inline in the page and/or made accessible via suitable interface controls. In some embodiments, the user may be able to set personal preferences related to the appearance of annotation-related information in search reports sent to her.

D. Enhanced Web Search

In one embodiment, search server 160 (FIG. 2) accesses the annotation libraries of a user's trust network members to provide additional information when responding to a query from that user. For example, as shown above a separate list of annotated hits (i.e., hits that correspond to annotated pages in the library of at least one trust network member) may be included in the search results, or annotated hits may be highlighted wherever they happen to appear in the results list. Where the annotations include ratings, a separate list of favorably-rated hits might be provided, rated hits might be highlighted in a manner that reflects the querying user's ratings, or ratings data might be used as a factor in ranking the hits.

Figure 10:
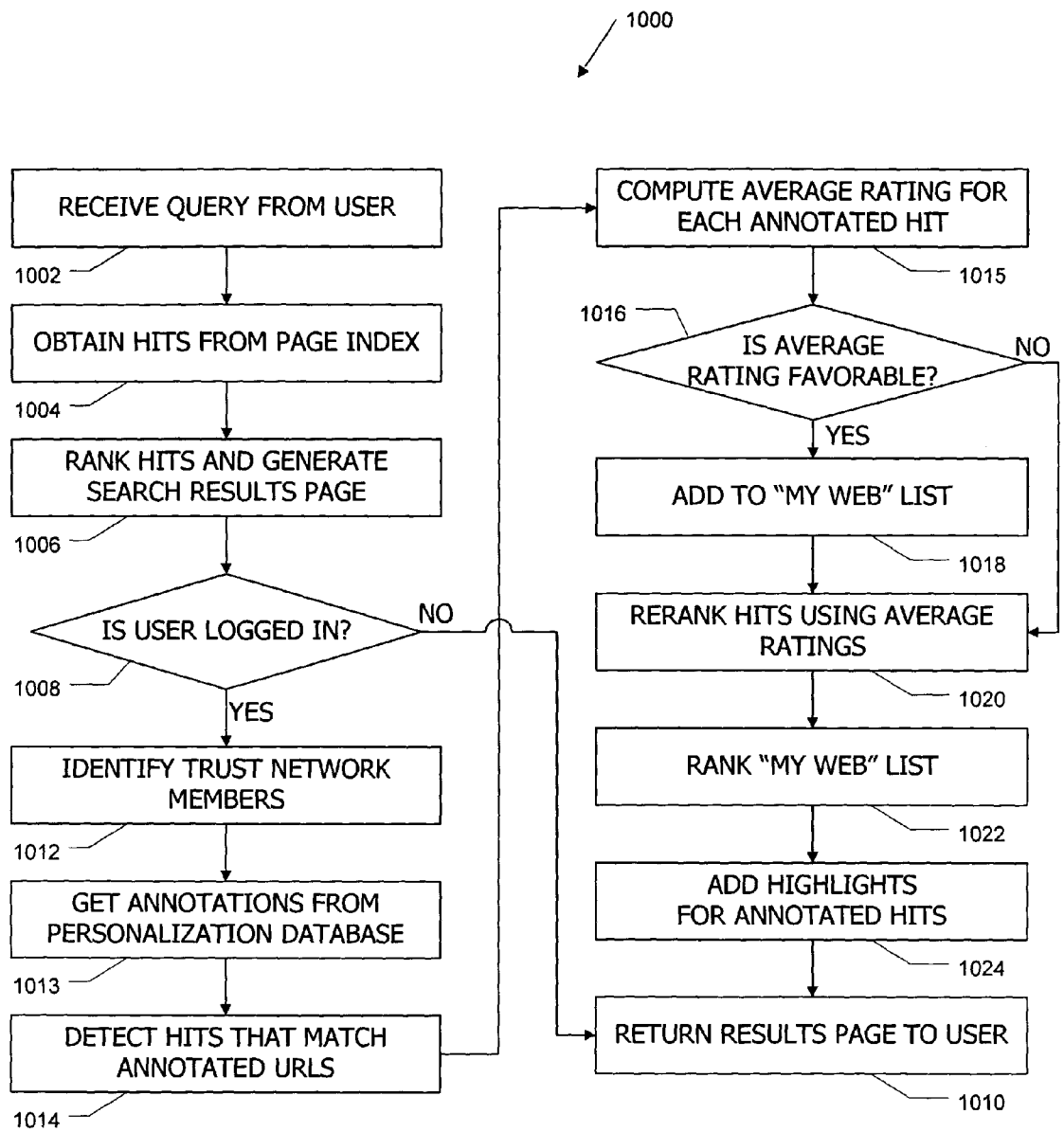
FIG. 10 is a flow diagram of a process for incorporating trust network members' annotations into a response to a current query from a querying user according to an embodiment of the present invention.

FIG. 10 is a flow diagram of a process 1000 that may be implemented in query processing module 162 (FIG. 2) for incorporating trust network members' annotations into a response to a current query from a querying user. At step 1002, the query is received. At step 1004, a list of hits corresponding to the query is obtained, e.g., from page index 170 (FIG. 2). At step 1006, query processing module 162 ranks the hits, e.g., using conventional algorithms.

At step 1008, query processing module 162 determines whether the querying user is logged in. If not, query processing module 162 may send the results page to the querying user without personalization at step 1010, enabling users to perform searches and obtain results without logging in to (or even being registered with) search server 160. If the user is logged in, then the results page is customized for that user based on information in personalization database 166.

More specifically, at step 1012, query processing module 162 provides the querying user's ID to personalization database 166 and retrieves a list of the user's trust network members. In one embodiment, step 1012 includes building the list of trust network members dynamically using trust network module 165. For example, where the trust network is to be built from lists of friends and extends to a maximum degree of separation ($N_{max}$) from the querying user, step 1012 might include creating a representation of the network graph by first obtaining the list of the querying user's friends from personalization database 166 and defining a network node for each friend. Where $N_{max}=1$, identification of trust network members may stop there; for $N_{max}>1$, a list of each friend's friends is obtained and additional nodes are defined, and so on until the maximum degree of separation is reached. It should be noted that for large enough $N_{max}$, the number of trust network members might extend to all users of the search system, and it may be desirable to limit $N_{max}$ or the total number of trust network members so as to avoid over-inundating a querying user with annotations.

In other embodiments, where the trust network is defined by reference to a community, step 1012 might include retrieving the current membership list for that community from personalization database 166 or another data store accessible to search server 160. In still other embodiments, step 1012 includes retrieving a pre-built list of members of the querying user's trust network from personalization database 166.

Where trust weights and/or confidence coefficients are used for identifying trust network members or using trust network information, step 1012 may also include determining the trust weights and/or confidence coefficients.

At step 1013, annotations created by the trust network members are retrieved from personalization database 166, and at step 1014, the URLs of the retrieved annotations are compared to URLs of the hits to detect any hits that match URLs for which at least one trust network member has previously created an annotation. Such hits are referred to herein as annotated hits. For annotations whose host flag is set to "site," a match (also referred to herein as a "partial match") is detected if the beginning portion of the hit URL matches the URL (or partial URL) stored in the annotation (e.g., in URL field 308 in FIG. 3). If the host flag is set to "page," an "exact" match between the URL of the annotation and the hit URL is required. "Match" as used herein includes both partial and exact matches unless specifically stated otherwise.

In embodiments where the annotations include ratings, for each annotated hit, an average or aggregate rating is computed at step 1015. As described above, the aggregate rating can be a weighted average (weighted by the confidence coefficient) over all trust network members who have annotated the hit. Ratings can also be weighted based on recency or other criteria. At step 1016 it is determined whether the aggregate rating is favorable. If so, then the hit is added to the favored results ("My Web") list. In other embodiments, all annotated hits, regardless of rating, might be added to the "My Web" list.

At step 1020, the results list is optionally reranked using the aggregate ratings. For example, during ranking, a base score can be generated for each hit (annotated or not) using a conventional ranking algorithm. For hits that have a favorable or unfavorable aggregate rating, a "bonus" can be determined from the rating. The bonus is advantageously defined such that favorably rated sites tend to move up in the rankings while unfavorably rated sites tend to move down. For instance, if low scores correspond to high rankings, the bonus for a favorable rating may be defined as a negative number and the bonus for an unfavorable rating as a positive number. In some embodiments, partial URL matches might be given a smaller bonus than exact URL matches. Unrated (or neutrally rated) hits would receive no bonus. This bonus can be added (algebraically) to the base score to determine a final score for each hit, and the new ranking can be based on the final scores.

In some embodiments, reranking at step 1020 may also include dropping any annotated hits that have an unfavorable aggregate rating from the list of hits to be displayed. In such embodiments, the search results page delivered to the user may include an indication of the number of hits that were dropped due to unfavorable aggregate ratings and/or a "Show all hits" button (or other control) that allows the user to see the search results displayed with the unfavorably rated hits included. In another variation, the user can click on a link to see just the unfavorably rated hits.

At step 1022, the "My Web" list is ranked and added to the search results page. In some embodiments, this ranking may be based on the base score or final score described above. In other embodiments, hits in the "My Web" list are sorted by aggregate rating; hits with the same rating may be further sorted according to the base score described above. In still other embodiments, hits in the "My Web" list are sorted based primarily on the number of trust network members who annotated that hit, which hit has an annotation from the closest member, or the like.

At step 1024, the search results page is modified based on the existence of annotations; e.g., highlighting and/or "Show My Web" buttons as described above can be added to the annotated hits. The modified search results page, in this case including the personalized "My Web" section, is sent to the user at step 1010.

It will be appreciated that the process described herein is illustrative and that variations and modifications are possible. Steps described as sequential may be executed in parallel, order of steps may be varied, and steps may be modified or combined. In some embodiments, some or all of the content of the annotation(s) for a hit, or aggregated metadata for the hit, might be displayed in-line in the search results page prior to an explicit request from the querying user. For instance, a visual highlighting element that indicates a favorable or unfavorable aggregate rating can be displayed, or the aggregate keywords might appear under the automatically generated abstract, and so on. In addition or alternatively, metadata from individual trust network members' annotations might be displayed, with or without attribution to their respective authors. In still other embodiments, the search results page might indicate which trust network members have annotated each annotated hit.

In other embodiments, trust network members' annotations may be used to identify hits during a search operation. For example, in addition to searching page index 170, query response module 162 may also search selected fields of the trust network members' annotations using some or all of the same search terms used to search page index 170. In one such embodiment, the keywords and/or description fields of the annotations are searched, and an annotated page is identified as a hit if the search terms appear in one of these fields, regardless of whether the annotated page was identified as a hit in the search of page index 170. In yet another embodiment, aggregate metadata (e.g., keywords aggregated across the trust network as described above) may also be searched.

E. Search in a Personal Web

In some embodiments, a querying user can search content that has been annotated by members of her trust network, rather than the entire Web. For example, search toolbar 706 of FIG. 7 includes text box 706 and "Search Web" button 704 that can be used to submit a query for searching the entire Web. Search toolbar 706 also includes a "My Web" button 720 that can be used to search content annotated by members of the user's trust network. Such content is referred to herein as a "Personal Web," and in general, to the extent that different users have different trust networks, different users will also have different Personal Webs. In one embodiment, a user who is logged in to search server 160 can enter a query into text box 706, then activate either button 709 to search the entire Web or button 720 to search her Personal Web. In the latter case, the search may be generally similar to a conventional Web search, except that only hits that have associated annotations from at least one member of the querying user's trust network are displayed. A Personal Web search option can also be provided through other interfaces, e.g., from a conventional search interface page or from a search results page.

In another embodiment, the querying user may also be able to search the annotations for her Personal Web in addition to or instead of the page content. For example, search toolbar 706 might include a button (not explicitly shown) that launches a Personal Web search interface page via which the querying user can define the desired scope for the search.

FIG. 11 is an example of a Personal Web search interface page 1100 according to an embodiment of the present invention. Page 1100 provides a user interface for field-specific searching within the user's Personal Web. Scope section 1102 allows the user to indicate whether the search should include annotated content from other trust network members, just the user's own annotated content, or the entire Web, including annotated content from all users. "Show My Trust Network" button 1104 advantageously allows the user to navigate to "My Trust Network" page 600 (FIG. 6) or a similar page via which the user can view and modify her current trust network definition, then return to page 1100. In some embodiments, the user may also be able to view a list of her trust network members and select one or more individual members, thereby limiting the search to annotations by those members.

Query section 1112 of page 1100 provides various text boxes into which the user can enter search terms for searching page content and/or searching particular fields in the annotation. In this example, the user can separately specify search terms for the page content (text box 1114), annotation title (text box 1116), keywords field (text box 1118), description (text box 1120), and/or referral (text box 1121). Radio buttons 1122 can be used to constrain a rating (e.g., an aggregate or average rating as described above) of the hits. By default, "Any rating" is selected, so that the rating does not limit the search; the user can opt to limit the search, e.g., to hits with favorable ratings or to hits with unfavorable ratings. "Search" button 1126 submits the query for processing, and "Reset" button 1128 clears all fields in query section 1112.

It is to be understood that the user may leave some or all of the text boxes in section 1112 empty; where a text box is empty, the corresponding field is not used to constrain the search. For example, the user could search the page content of her Personal Web by entering search terms in text box 1114 and leaving the other text boxes empty; the actual search could be performed using page index 170, with any hits that do not correspond to an annotated page or site being discarded before transmitting the results to the user. Results of the search are advantageously delivered using a search result page similar to page 900 (FIG. 9A) or 940 (FIG. 9B) described above, except that in searches limited to the user's Personal Web, every hit has at least one annotation.

Figure 12:
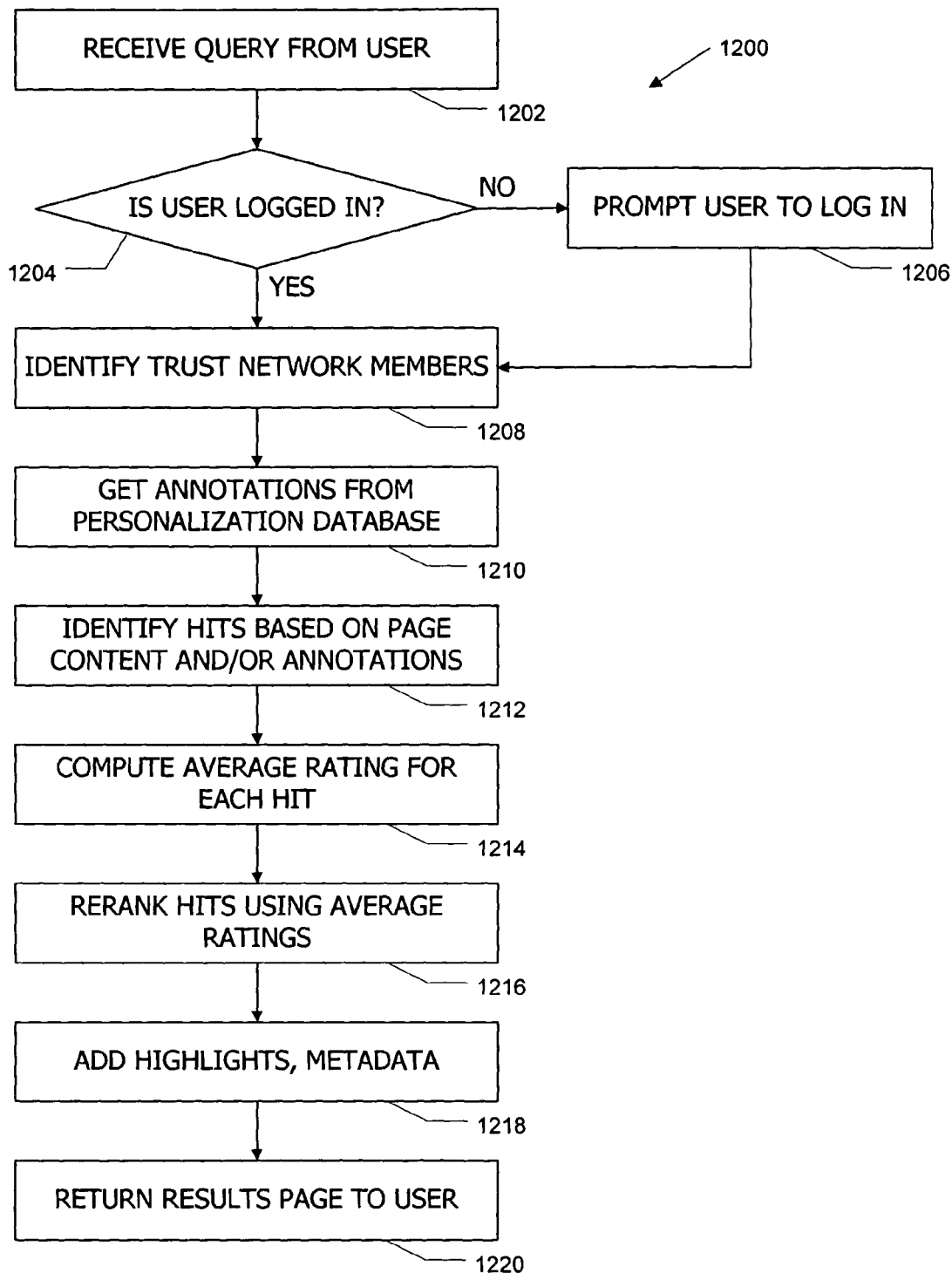
FIG. 12 is a flow diagram of a process for responding to a query during a Personal Web search according to an embodiment of the present invention.

FIG. 12 is a flow diagram of a process 1200 for responding to a query submitted via page 1100 or another interface for searching a Personal Web according to an embodiment of the present invention. At step 1202, the query is received from the user. At step 1204, it is determined whether the querying user is logged in. If not, the user can be prompted to log in at step 1206, or the operation can be aborted. At step 1208, the members of the user's trust network are identified; this step can be generally similar to step 1012 of process 1000 (FIG. 10) described above. At step 1210, annotations authored by trust network members (including the querying user) are retrieved from personalization database 166.

At step 1212, search hits are identified based on the page content and/or the annotation content, depending on the query. Where the page content is to be searched, information about page content can be obtained either from page index 170 or from the annotations in personalization database 166 if a representation of the page content is stored therein. Other fields are searched using the trust network members' annotations obtained from personalization database 166. Regardless of the particular search algorithm, a page is advantageously identified as a hit only if at least one member of the querying user's trust network has annotated it. For example, where page content is to be searched, the search could be performed over the entire corpus as represented in page index 170, with the resulting global list of hits being filtered based on the presence or absence of annotations, or the annotations retrieved at step 1210 could be used to generate a pool of documents represented in page index 170 that are to be searched.

In some embodiments, the hits are reranked or highlighted based on the average rating. Accordingly, at step 1214, an average rating for each hit is computed, similarly to step 1015 of process 1000 (FIG. 10) described above. At step 1216, the hits are reranked using the average ratings, similarly to step 1020 of process 1000. At step 1218, any desired highlighting or metadata can be added to the listing of hits. For example, as described above, visual highlighting might be applied to each hit to reflect the average rating for that hit; a "Show My Web" button might be associated with each hit to allow the user to view annotations by individual trust network members; or metadata extracted from individual annotations and/or aggregated metadata (e.g., the average rating or aggregate keyword set) might be added to the listing. At step 1218, the search results page, including the listing of hits, is returned to the querying user.

It will be appreciated that the search interface and search process described herein are illustrative and that variations and modifications are possible. Process steps described as sequential may be executed in parallel, order of steps may be varied, and steps may be modified or combined.

The query interface may be varied. For example, in another interface, a single text box is provided, and the user is prompted to select whether search terms in the text box should be searched in the page contents and/or in various fields of the annotation record (e.g., title, keywords, description, and/or other fields). In still another embodiment, a "basic" search interface with a single text box is provided by default, and the search is performed over the page content and one or more pre-selected annotation fields. The user can accept this basic search configuration or opt to view query section 1112 (or another query interface) to enter a more complex query. Other query interfaces and combinations of interfaces are also possible.

In some embodiments, search page 1100 may also be accessible via a button on a toolbar (e.g., button 720 of toolbar 706 in FIG. 7) or other suitable element of a persistent user interface, or from a search provider's main page. If a user who is not logged in to search server 160 attempts to access page 1100, the user may be prompted to log in before page 1100 is displayed.

In addition, while the term "Personal Web" is used above, it will be recognized that a "personal" version of any document corpus that is accessed by multiple users could also be defined and searched in a manner similar to that described above.

F. Exploring a Personal Web

In some embodiments, a user can explore her Personal Web without entering a query. For example, a user may be able to browse through her own annotations by folder, or to browse through annotations by members of her trust network by folder, using a suitably configured interface.

In other embodiments, a user may be able to search for other documents (e.g., pages or sites) that are similar to or related to pages or sites that have been annotated by members of her trust network. "Similar" documents are documents that contain content meeting some similarity criterion relative to an annotated page. Examples of similarity criteria include:

having some number of words, phrases, or other multi-word units in common; having similar patterns of occurrence of words, phrases or other multiword units; belonging to the same category or closely related categories in a system-defined taxonomy; or the like. Algorithms for determining similarity between two pages are known in the art and may be used with the present invention. "Related" documents share portions of a URL (e.g., at least a domain name) with the rated page; again, known algorithms for determining relatedness may be used.

In another embodiment, a user might be able to explore correlations of annotations. For instance, the user might be able to select a "starting" page or site and obtain a listing of other pages or sites most frequently annotated by those users who had also annotated the starting page or site.

The user may be able to initiate a search for similar, related, or correlated documents from a search result page or from a toolbar interface whenever an annotated document is displayed. For example, overlay 800 of FIG. 8 or toolbar 706 of FIG. 7 might include control elements by which such searches can be initiated.

In other embodiments, the user may be able to view information about activity in her Personal Web. For example, page 1100 (FIG. 11) or another Personal Web interface page might include various controls (not shown in FIG. 11) allowing the user to view listings of information. In one embodiment, the user can view a listing of pages or annotations most recently added to her Personal Web. In another embodiment, the user can view a listing of the pages that have been annotated by the largest number of trust network members or a listing of pages that have the highest average or aggregate rating within her trust network. In still another embodiment, the user can view a listing of the pages most frequently visited by members of her trust network over some time period. Any of these or other lists may also include metadata from the annotations, summaries or aggregations of metadata from the annotations, or the like.

In further embodiments, such information may be used in responding to queries. For example, a list of annotated pages or sites for which the user's query (or a keyword from the user's query) matches the Referral field in at least one trust network member's annotation might be provided. Other variations, additions and modifications are also possible.

G. Personal Web Statistics

In some embodiments, the user might be able to view statistical information about activity by members of her trust network.

For example, the user may be able to see statistics about queries submitted by her trust network members to search server 160 over some period of time, such as the most popular queries within her trust network, the queries whose popularity has changed most dramatically, and so on. Such listings may be similar to existing "Buzz" features provided by Yahoo!, Inc., assignee of the present application but would include only queries submitted by members of the user's trust network.

In other embodiments, other statistical information might be available. For example, the user might be able to view a listing of the most popular pages (or sites) among members of her trust network, as measured, e.g., by the number of members who have annotated the same page or site or by the average rating given by the members who had annotated the page. Another list might include the pages or sites most recently annotated by members; entries in such a list could indicate who had annotated the page and could also provide a link to view the page and/or the new annotation. The user might also be able to filter such listings, e.g., by specifying that the annotations should include a particular keyword (or multiple keywords).

H. Limiting Access to Annotations

As described above, in embodiments of the present invention, some or all of one user's annotations may become visible to other users who are connected by trust relationships to the first user. While each user generally has the ability to identify her friends, in some embodiments a user might not have the ability to prevent other users from identifying her as a friend. Thus, it may be desirable to allow the user to establish privacy settings to control whether other users can view any or all of her annotations. In some embodiments, folder records (see, e.g., FIG. 4) or annotation records include two additional fields related to managing access: a privacy level (field 416) and an access list (field 418). Where a privacy level is established for a folder, that privacy level applies to all annotations within that folder. In some embodiments, a user can establish a default privacy level for a folder, then override that default for individual annotations within the folder.

In one embodiment, the privacy level may be set to one of "Public," "Shared," or "Private." If an annotation (or its folder) is marked "Public," the annotation can be seen by other registered users of the system and will be (at least potentially) visible to any other user if the annotating user is in the other user's trust network. "Visible to a user" in this context means that the annotation could appear to the user in a display such as overlay 800 or that it could be used in determining aggregate metadata across the user's trust network. For example, referring to the trust relationships shown in FIG. 5, if a trust network for user A is defined to include all users at up to two degrees of separation, user G would be in user A's trust network and user A would be able to see any of user G's annotations that user G had marked "Public."

If an annotation (or its folder) is marked "Shared," the annotation can be seen by another user only if: (1) the annotating user is in the other user's trust network; and (2) the other user is in the annotating user's trust network. For example, referring again to FIG. 5, even though user G is in user A's trust network, user A would not be able to see any of user G's annotations that user G had marked "Shared" because user A is not in user G's trust network. Users A and C, on the other hand, would each be able to see the other's "Shared" annotations.

If an annotation (or its folder) is marked "Private," the annotation can be seen by another user only if: (1) the annotating user is in the other user's trust network; and (2) the other user is on the annotation's (or folder's) access list. Like other privacy settings, the access list for a private annotation is advantageously maintained by the annotation's author. For example, referring again to FIG. 5, user A would be able to see user C's annotations that user C had marked "Private" only if user C had placed user A on the access list for that annotation. Thus, a user can keep some annotations hidden from some or all of her friends.

In preferred embodiments, any annotation is always visible to its author, regardless of privacy level.

To further illustrate the use of folder privacy settings, reference is made to FIG. 13, where listing 1302 shows privacy levels for various folders (Main and F1-F4) that might be defined by user B and annotations (J1-J10) created by user B that might be contained in each folder, listing 1304 shows the members of user B's trust network, and listing 1306 shows the members of user A's trust network. Suppose that user A enters a query that is processed in accordance with process 1000 (FIG. 10) described above. At step 1012, it would be determined that user B is a member of user A's trust network. At step 1013, user B's folder tree (see listing 1302) would be traversed to retrieve user B's annotations. Folder "Main" is marked "Public"; therefore, annotations J1-J3 are visible to user A and would be retrieved for use in responding to user A's query. Folder "F1" is marked "Private" with no access granted to user A; therefore, annotations J4 and J5 are not visible to user A and would not be retrieved. Folder "F2" is also marked "Private", but access is granted to user A; therefore, annotation J6 is visible to user A and would be retrieved. Folder "F3" is marked "Public"; annotations J7 and J8 would be retrieved. Folder "F4" is marked "Shared", but it is not visible to user A because user A is not in user B's trust network; accordingly, annotations J9 and J10 are not visible to user A and would not be retrieved. Thus, in process 1000, the visible annotations J1-J3 and J6-J8 would be retrieved and used in responding to user A's query, while the invisible annotations J4, J5, J9, and J10 would not. From the perspective of user A, it is as if the invisible annotations do not exist, and the aggregate trust network rating for any hits that B might have rated using invisible annotations would be computed at step 1015 of process 1000 as if user B had not annotated the hit.

It will be appreciated that other privacy mechanisms might be provided in addition to or instead of those described herein. More or fewer privacy levels might be defined. In some embodiments, access to an author's "Shared" folders of annotations can be determined with reference to data other than the author's trust network, e.g., the author's IM friends list, e-mail address book, members of a Yahoo! group or other voluntary association selected by the author, and so on.

In another embodiment, information sharing can be controlled based on the keywords used in particular annotations. For example, an annotating user might be able to specify that all annotations containing the keyword "cycling" should be treated as public while all annotations containing the keyword "football" should be treated as shared and so on. Where an annotation includes keywords to which different privacy levels are assigned, a system-wide rule can be applied to determine whether the more restrictive or less restrictive privacy level should govern sharing of the annotations.

In some embodiments, metadata can be aggregated globally (e.g., across annotations by all registered users of search server 160). For instance, a global rating for a page can be determined by averaging all user-supplied ratings of that page. In some embodiments, the privacy settings established by authors are respected during global aggregation; e.g., only annotations marked "Public" might be used. In other embodiments, privacy settings are ignored, and all annotations are used.

III. Static Sharing of Annotations

In some embodiments of the present invention, a user can also share her annotations by distributing copies of her annotations to other users. Unlike the dynamic sharing described above, static sharing advantageously results in the receiving user obtaining his own copy of the annotation, which he can edit, delete, or otherwise modify without affecting the sharing user's annotations.

A. Exporting and Importing Annotations

In some embodiments, users can export and import annotations. For example, an "exporting" user may send all of the annotations in her library (or a selected subset of those annotations) to another user, who may then elect to "import" the annotations into his own library. Embodiments supporting exporting and importing of annotations will now be described.

In one embodiment, an interface page is provided via which a user can view and edit her own annotations. FIG. 14 is an example of a library interface page 1400; a similar interface is described in above-referenced application Ser. No. 11/081,860. By manipulating the viewing options in a control section 1402, a user can create a customized listing of her own annotations in a list section 1404.

Each annotation displayed in list section 1404 has a check box 1406 that can be used to select annotations for exporting. Once the selection is made (by checking or unchecking various boxes 1406), the user can operate button 1408 to export the checked annotations. Alternatively, the user can operate button 1410 to export all the annotations listed in section 1404 without regard to check boxes 1406.

When the user activates button 1408 or 1410, an exportable version of the selected annotations is created. For example, some or all of the metadata of each annotation being exported can be retrieved from personalization database 166, reformatted as necessary (e.g., inserted into one or more Web pages), and placed in a temporary storage area from which it can be retrieved using an appropriate resource identifier (e.g., a URL).

The exporting user is prompted to identify a delivery method (e.g., IM, e-mail) and to provide appropriate identifiers (e.g., IM screen name, e-mail address) for one or more recipients. In preferred embodiments, a trust relationship between the exporting user and a recipient is not required; the exporting user may export her annotations to anyone she chooses. The exported annotations, or other data signaling the availability of the exported annotations, are delivered to the identified recipients. The notification scheme depends on the delivery method; for example, suitably configured e-mail messages or instant messages might be used.

Figure 15:
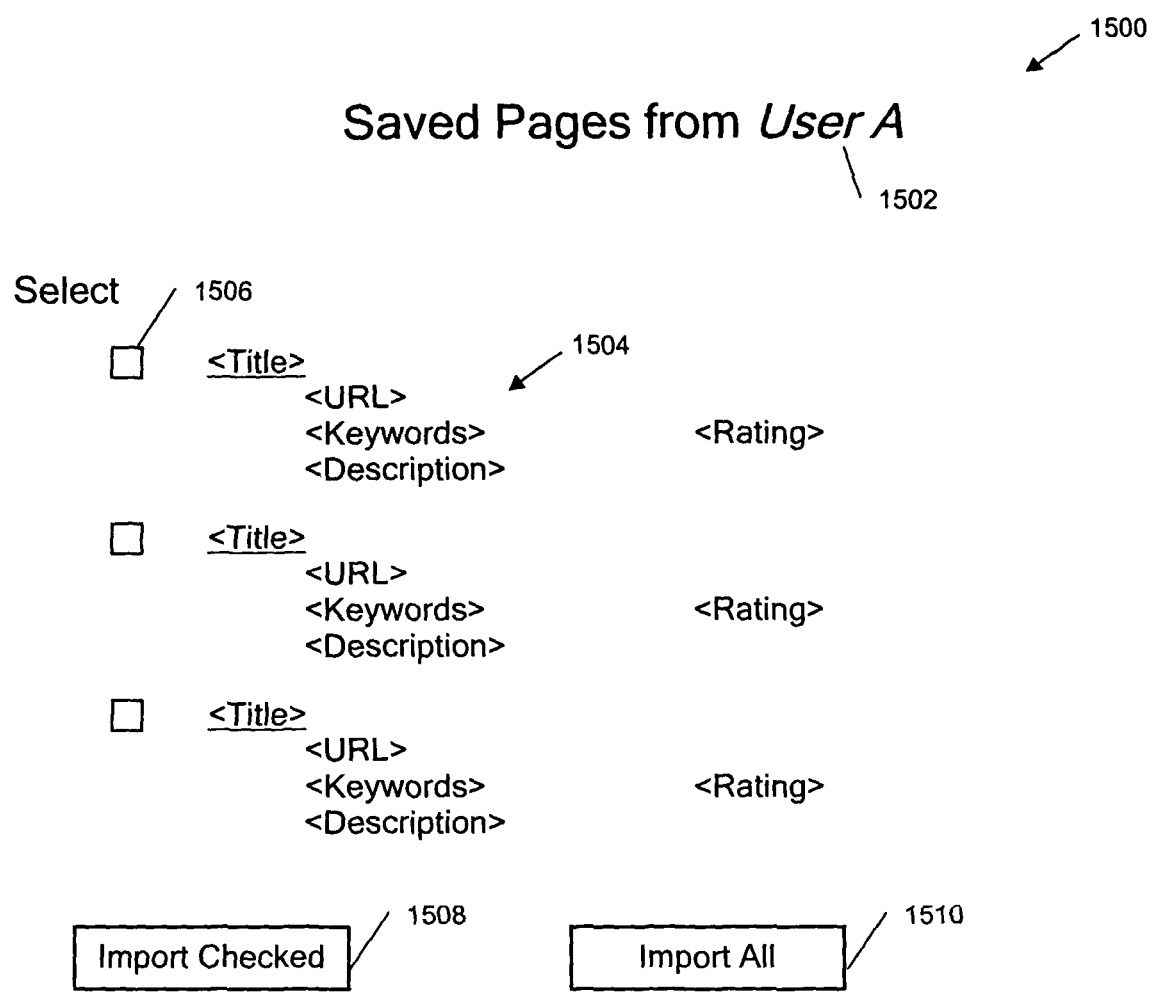
FIG. 15 is an example of an import interface page according to an embodiment of the present invention.

Each recipient has the option to import the annotations into his own library. In one embodiment, an e-mail or IM client may be configured to recognize that an incoming message contains one or more annotations and ask the user whether to import the annotations. In another embodiment, the exported annotations are packaged into a displayable Web page, and the URL for that page is delivered to the recipient, e.g., via e-mail or IM. The recipient can view the exported annotations and select which, if any, to import. FIG. 15 is an example of an import interface page 1500 that may be referenced by a URL sent to the recipient. If the recipient is not signed in when he navigates to page 1500, he may be prompted to sign in before viewing the page or importing any annotations.

Heading 1502 identifies the source of the annotations (e.g., by displaying the user ID of the exporting user). Listings 1504 include selected fields from each annotation. In this example, the Title, URL, Keywords, Description and Rating fields are shown. In other embodiments, other fields may be shown in addition to or instead of those shown in FIG. 15, and the importing user or the exporting user may select the fields to be displayed. Each entry may include an active link via which the recipient can navigate from page 1500 to the subject page.

Each listing 1504 includes a checkbox 1506 that the recipient may check or clear. Control buttons are provided enabling the recipient to import checked items (button 1508) or import all items (button 1510). Other controls may also be provided.

When a recipient imports an annotation, a new annotation record (e.g., as illustrated in FIG. 3 described above) is advantageously created and added to personalization database 166. The author of the new annotation is the importing user (not the exporting user), and the "referral" field of each imported annotation advantageously identifies the exporting user as the source of the annotation. The "old referral" field may include referral information from the exporting user's annotations or may be reset to a default (e.g., empty) value. The "last updated" field may be updated to reflect when the annotation was imported, and any counters or other statistics associated with the annotation (e.g., last visited, number of times visited) may be reset for the importing user. Thereafter, the imported annotation is treated as if it had been created by the importing user. For instance, it is visible to the importing user without regard to any privacy settings, and the importing user may edit or delete it.

B. Publishing Annotations

In addition to exporting annotations to other users, a user may also publish her annotations. As used herein "publication" of annotations refers to automatic distribution, via any suitable channel, of a user's annotations and may include periodic re-publication to reflect changes made by the publishing user. Republication of the annotations, or publication of updates, may occur at regular intervals, in response to changes in the information, or on some other schedule. For some publication channels, the publishing user may have some control over who receives the data; for other channels, the receiving users decide which published information to view.

In one embodiment, a user may designate some or all of her folders for publication using the Publication flag described above (see FIG. 4); in other embodiments, the user may designate individual annotations for publication, or may control publication based on the presence or absence of keywords in the annotations. An automated distribution process executed by search server 160 of FIG. 2 or another suitably configured server identifies any annotations to be published (or re-published) and generates a publication message appropriate to the publication channel.

Various technologies and channels may be used to support publication. In one embodiment, the annotations selected for publication may be used to periodically update an RSS (Really Simple Syndication, also known as Rich Site Summary or RDF (Resource Description Framework) Site Summary) feed. Subscribers to the RSS feed would receive notice of the updated annotations and would be able to choose whether to import them, e.g., using an interface similar to importation page 1500 described above. In another embodiment, a URL pointing to the updated list of the publishing user's annotations (e.g., to an importation Web page such as page 1500) might be periodically distributed to an e-mail list identified by the user, periodically posted to a community's bulletin board or chat room, or the like. Each user on the e-mail list could then link to the URL and import any or all of the annotations listed. In still another embodiment, the list (or updates to the list) could be automatically posted to a blog (Web log) maintained for the publishing user. In yet another embodiment, the user may maintain a publicly accessible Web page that incorporates the annotations, and this Web page may be automatically updated from time to time.

IV. Annotations in Communities of Users

A. Expert Filtering of Content

In some embodiments of the present invention, a user can search within a library of pages or sites that have been annotated by members of some community; such a library is referred to herein as a "Community Web." The user might or might not be affiliated with the community, and community members might or might not have explicit trust relationships defined among themselves.

For example, in one embodiment, registered users of search server 160 (FIG. 2) can voluntarily join online communities (e.g., Yahoo! Groups) whose members can communicate via dedicated message boards, e-mail lists, chat rooms, or the like maintained or hosted by a provider of search server 160. Personalization database 166 (or another database) advantageously includes a listing of user identifiers for the members of each such community. Another user, regardless of whether he is a member of the community, can execute a search over that community's content. This feature may be of interest, for instance, to users who are exploring popular topics that they do not know well. Thus, by way of example, a user who is not already familiar with the "Harry Potter" books might be interested in searching for information about them. Searching the Web with the query "Harry Potter" would return millions of hits (too many for a user to visit in a reasonable time), but the user would have no idea which of those millions of pages or sites are worth visiting. By restricting the search to pages or sites that have been evaluated by members of a community of Harry Potter fans, the user can leverage the fans' knowledge and opinions to quickly find content that is likely to be reliable and useful.

Figure 16A:
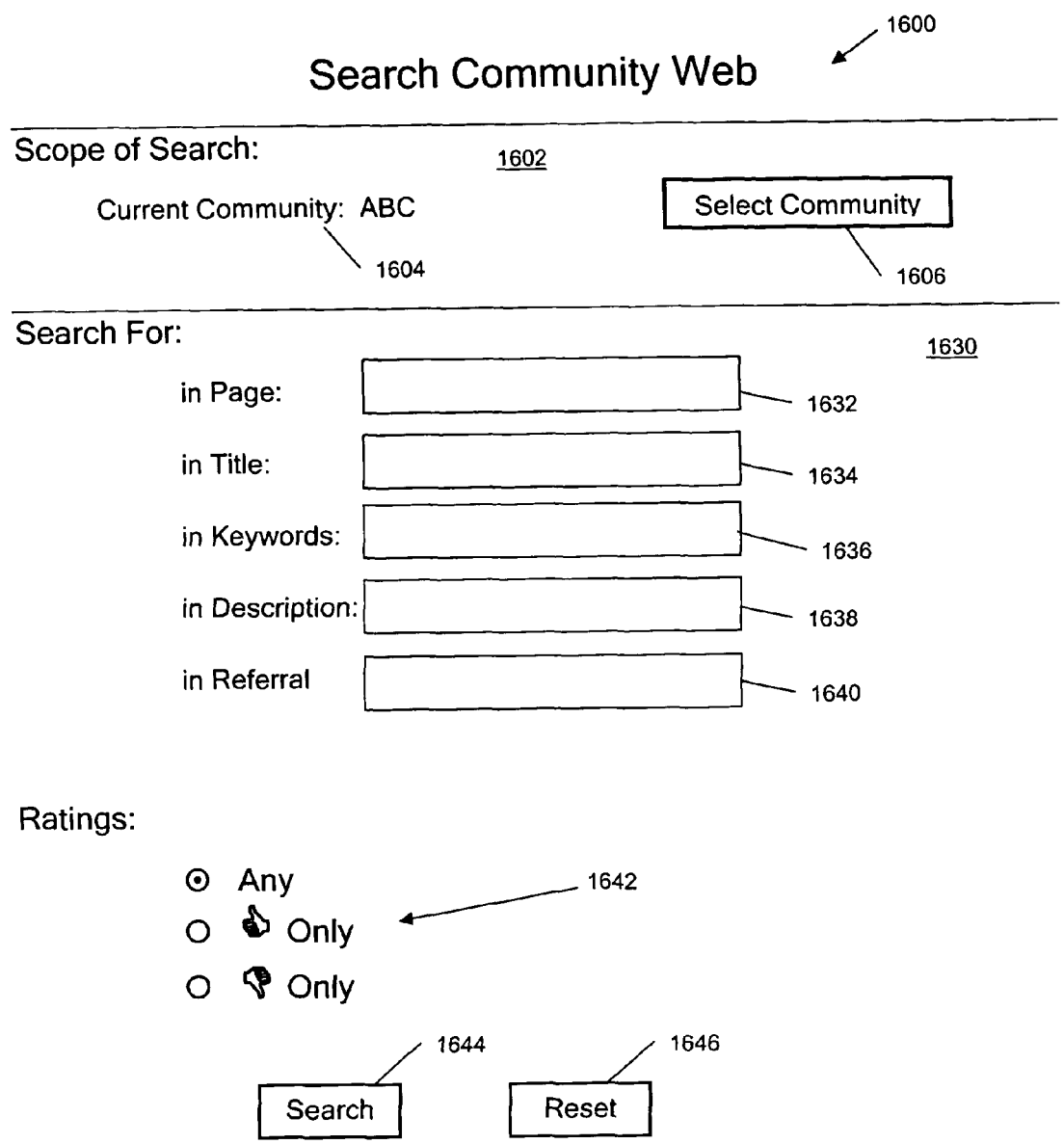
FIGS. 16A and 16B are examples of interface pages for searching a Community Web according to an embodiment of the present invention.

FIG. 16A illustrates an interface page 1600 for searching a Community Web according to an embodiment of the present invention. A user may access page 1600, e.g., by operating an appropriate button on a search toolbar or from a search interface page.

Section 1602 enables the user to specify which community or communities are to be used to define a Community Web to be searched. At 1604, the currently selected active community (or communities) is listed, and button 1606 may be used to change the selection.

Figure 16B:
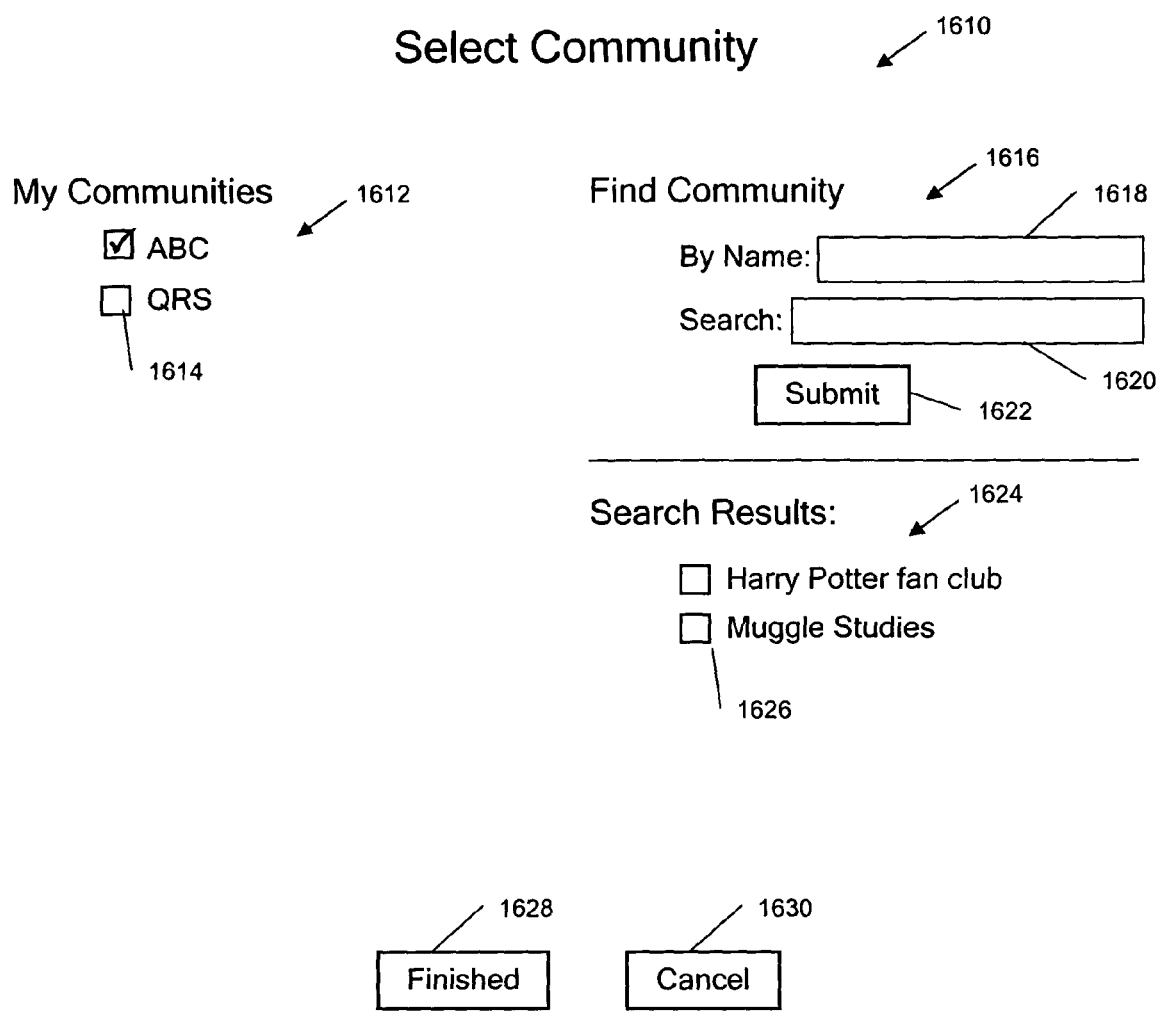

More specifically, FIG. 16B illustrates a community selection page 1610 according to an embodiment of the present invention. Page 1610 may be displayed when the user operates button 1606. At the left, a list 1612 of communities ("ABC" and "QRS") of which the querying user is a member is presented. Next to each community name is a checkbox 1614 that the user can check to select that community or uncheck to deselect that community. In this embodiment, the user can select multiple communities; in other embodiments, the user may be limited to selecting only one community at a time.

At the right is a search interface 1616 that enables the user to find and select communities of which he is not a member. The user can search for a community by name using a text box 1618 and/or by keywords using a text box 1620. The search is executed when the user presses a "Submit" button 1622. The search for communities is advantageously executed on a searchable directory of communities (e.g., the Yahoo! Groups directory) maintained by the provider of search server 160. The directory advantageously includes a name for each community and a brief description of the community. In one embodiment, search terms entered into text box 1618 are matched against community names and search terms entered into text box 1620 are matched against the descriptions as well as the names.

Search results, in this case the names and optionally brief descriptions of any communities that match the query, are displayed in area 1624. The number of communities listed may be limited, e.g., to ten (or some other number), and communities may be selected for listing or ranked within the listing based on various criteria. In some embodiments, the criteria relate to the likelihood that the community will provide a useful library of annotated content. For instance, communities could be selected based on the number of members, the total number of pages or sites that have been rated by the members, the amount of activity on the community's message board, e-mail list, or chat room, and so on. Statistics of this or similar kind might be displayed in area 1624.

The user can select one or more of the listed communities using check boxes 1626. In preferred embodiments, checking a box 1626 does not result in the user joining the community and does not provide the user with any information about individual community members. "Finished" button 1628 allows the user to return to page 1600 (FIG. 16A) with the new selection of a community or communities; the new selection will be shown at 1602 when page 1600 is redisplayed. "Cancel" button 1630 on page 1610 allows the user to return to page 1600 without changing the selection.

Referring again to FIG. 16A, at page 1600, the user enters a query in query section 1630. Query section 1630 provides various boxes where the user can enter search terms specific to particular fields of metadata in the annotations. In this example, the user can specify search terms for the page content (text box 1632) and/or annotation fields such as title (text box 1634), keywords (text box 1636), description (text box 1638), and/or Referral (text box 1640). It is to be understood that the user is not required to enter search terms into all of the boxes in section 1630; fields corresponding to boxes with no search terms are not used to constrain the search. The user can also specify a desired rating using radio buttons 1642. "Search" button 1644 submits the query for processing, and "Reset" button 1646 clears all fields in query section 1630. Thus, query section 1630 for searching a Community Web may be generally similar to a Personal Web query interface (e.g., FIG. 11).

Processes used for searching a Community Web can be generally similar to processes used for searching a Personal Web (e.g., FIG. 12). However, the query received from the user would identify a selected community (or multiple communities) whose Community Web is to be searched, and step 1208 would include identifying all members of the designated community rather than members of the querying user's trust network. Identification of community members can be done without regard to trust relationships. The search is limited to documents that have been annotated by at least one member of the selected community.

In preferred embodiments, the community members' privacy settings can be applied during a Community Web search, with the community members being treated as if they were members of the querying user's trust network. For the privacy settings described above, each community member's "Public" annotations would be used in all instances; "Shared" annotations would be used if the querying user happens to be in the community member's trust network; and "Private" annotations would be used only if the querying user happens to be on the access list for that annotation.

In addition, the use of annotation metadata in identifying and reporting hits may be somewhat different. For example, a search over keywords might be based on an aggregation of the keywords across the community members. In one embodiment, a keyword match is detected only if some minimum fraction of the community members who annotated the page used that keyword. In another embodiment, a keyword match is detected if at least one community member used that keyword. Similarly, whether a page satisfies a rating requirement might be determined based on the average rating across the community members who annotated the page, or on whether a minimum fraction of the community members gave the page the specified rating, or on whether at least one community member gave the page the specified rating.

In some embodiments, each community member's annotations may be given equal weight. In other embodiments, the weight given to each rater's annotations may be determined by the total trust weight assigned to that rater by other members of the group, the number of group members whose lists of friends include the rater, the rater's reputation score in the community or global reputation score (e.g., as described below), or other factors.

When search results are reported to the user, the user's access to metadata from individual community members is advantageously limited. For example, in one embodiment, the search result provides only an average rating and/or an aggregate listing of keywords for each hit and may also indicate information such as the number or fraction of community members who have annotated that hit. Such information can allow the querying user to assess the quality of the information he is getting without revealing any information about the identity or annotations of individual community members.

In another embodiment, the search result may provide anonymous excerpts from individual annotations. For instance, excerpts from description fields could be included without attribution to a specific author, or a listing of all keywords (alphabetically or by frequency) could be reported without attributing keywords to individuals, or a list of unattributed ratings (e.g., in chronological order) could be included.

In other embodiments, the user may be able to view information about activity in the Community Web. For example, page 1600 (FIG. 16A) or another interface page might include various controls (not shown) allowing the user to view listings of information. In one embodiment, the user can view a listing of pages or annotations most recently added to the Community Web. In another embodiment, the user can view a listing of the pages that have been annotated by the largest number of community members or a listing of pages that have the highest average rating within the community. In still another embodiment, the user can view a listing of the pages most frequently visited by members of the community. Like the Community Web search result page described above, any of these or other listings may also include aggregate or anonymous annotation information. Privacy settings established by the community members are advantageously respected in this context as well.

It will be appreciated that a Community Web is, in many respects, similar to a Personal Web, particularly in the case where the trust network for the user's Personal Web is defined by reference to a community rather than to individual friends. Thus, any of the above search and browsing operations described for a Personal Web can also be extended to a Community Web. In the case where the user accessing a Community Web is not a member of the community, however, information identifying individual community members is advantageously not made available to the accessing user.

B. Suggesting Communities

In some embodiments, the search provider may analyze patterns in user A's annotations and, based on those patterns, identify various communities that user A might be interested in joining. For example, the search provider might select an interest-based community G (e.g., a Yahoo! group) and identify the pages comprising the Community Web for that community; the provider might also determine the average ratings that members of community G have given to some number of annotated pages.

Assuming that user A is not already a member of community G, user A's library of annotations can then be compared to the Community Web for community G to detect an affinity between them. "Affinity" as used herein refers to generally to a pattern of common interests and/or tastes, and can be measured in various ways. For example, the number of pages in community G's Community Web that user A has also annotated can be used to measure affinity. As another example, a correlation between ratings given to the same page by user A and Community G can be measured. Correlations between user A's keywords and community G's aggregate keywords for particular pages can also be used. In another embodiment, if a log of queries per user is maintained, patterns in user A's queries might also be compared to patterns in queries entered by members of community G to determine whether user A and members of community G have similar interests and tastes. If the affinity appears high enough, the provider issues a suggestion (e.g., via e-mail) that user A should consider joining community G. Alternatively, the provider might issue a suggestion to a representative of community G to consider inviting user A to join.

In one embodiment, user A has the option to receive such suggestions or not. For example, user A might be able to opt in or opt out of receiving suggestions for communities to join via a user profile page. If a user opts out, then suggestions are not generated for that user.

While the system could automatically add user A to a suggested community, in preferred embodiments, user A controls the final decision on whether to join a suggested community. For instance, the suggestion might be sent in an e-mail message that can include a link that user A can follow to obtain more information about the community or to join it, contact information (e.g., e-mail address or IM screen name) for a current member of the community, or the like. Thus, user A can decide how and whether to follow up on any suggestions received.

In some embodiments, user A may receive suggestions to join any community that can be joined voluntarily (e.g., a Yahoo! Group). In other embodiments, existing members of the community may decide whether or not to participate in an affinity-based referral program for gaining new members. For example, online communities typically have an "owner," a member of the community who has been designated as a point of contact for the provider of the online-community service and who has authority to set various operating rules or preferences for the community (e.g., whether an e-mail list associated with the community is moderated or not, whether new members have to be approved, etc.). Where the service provider offers an affinity based referral program, the owner of each community may indicate whether that community wants to participate or not, and the service provider abides by the expressed preference.

C. Meta-Ratings

In some embodiments, when a querying or browsing user views an annotation, she may be prompted to evaluate the annotation, e.g., as to whether or not she found it helpful. For example, overlay 800 of FIG. 8 might include a set of feedback buttons via which the user can submit a rating of the annotation, referred to herein as a "meta-rating." Meta-ratings submitted by users are advantageously stored in personalization database 166 (FIG. 2) in association with the annotation that was rated, the author of the annotation, and the user who rated the annotation. Meta-ratings can be used in a variety of ways.

In some embodiments, meta-ratings can be used to determine which annotations to display first. For example, in instances where a large number of members of user A's trust network have annotated a page, it may be impractical to display all of the annotations at once; even if all annotations are to be displayed together, there is still a need to select an order for displaying them. The order is advantageously determined in a manner that maximizes the likelihood that an annotation given prominent placement will be helpful to the user for whom it is displayed. Where user A has annotated the page, it can be assumed that user A will find her own annotations helpful, and her annotation can be displayed first. Where user A has not annotated the page, or where other users' annotations are to be displayed in addition to user A's own annotation, meta-ratings can be used to determine how to order the other users' annotations.

Thus, in some embodiments, an aggregate meta-rating for each annotation of a particular page or search hit can be computed, and the annotation with the most favorable aggregate meta-rating can be shown to user A first (after A's own annotation where applicable). The aggregate meta-rating might be, e.g., a weighted average of meta-ratings given by members of user A's trust network; the weights can be determined from confidence coefficients for each member relative to user A, degree of separation from user A, or the like. Alternatively, the aggregate meta-rating might be, e.g., an average of the meta-ratings from all users who have rated the annotation, regardless of whether they are in user A's trust network.

In other embodiments, an aggregate meta-rating for each user X who annotates pages can be computed and used to determine a reputation score for user X. An aggregate meta-rating can be computed, e.g., by averaging the ratings given to user X's annotations. The reputation score for a user X can be determined globally, e.g., by averaging all meta-ratings given to user X's annotations by all users of the annotation system, or per community, e.g., by averaging separately the meta-ratings given to user X's annotations by members of each community to which user X belongs. Thus, each user might have one or more reputation scores.

Reputation scores can be used in generally the same manner as confidence coefficients or trust weights described above. For instance, the order for displaying annotations of a page or site can be determined based on the applicable reputation scores of their authors. Reputation scores can also be used as weights to determine aggregate ratings for pages or sites in any context where aggregate ratings are of interest. Reputation scores can also be used in place of trust weights or confidence coefficients during Community Web searches, including in instances when the querying user is not a member of the community whose annotated content is being searched. Using community-specific reputation scores during a Community Web search may provide a reliable indicator of what content that community as a whole finds interesting or valuable.

V. Further Embodiments

While the invention has been described with respect to specific embodiments, one skilled in the art will recognize that numerous modifications are possible. For instance, the appearance of various search reports and user interfaces may differ from the examples shown herein. Interface elements are not limited to buttons, clickable regions of a page, text boxes, or other specific elements described herein; any interface implementation may be used.

It should be understood that in its rating-related the invention is also not limited to any particular rating scheme, and some embodiments might offer users the option of choosing among alternative rating schemes (e.g., thumbs up/thumbs down or rating on a scale). In some embodiments, only favorable or neutral ratings might be supported. In other embodiments, ratings might not be collected at all. Where ratings are not collected, user annotations can still be collected and can provide other types of metadata that can be reported in an inverse search report, including but not limited to various types of metadata described above.

Further, in some embodiments, rather than a single overall rating, the user might be able to rate specific dimensions of a page or site, including dimensions related to technical performance, content, and esthetics. For example, technical performance ratings might include ratings reflecting the speed of accessing the page, reliability of the server, whether outgoing links from the page work, and so on. Content ratings might include ratings reflecting whether the content is current, accurate, comprehensible, well organized, and so on. Esthetic ratings might include ratings reflecting the user's opinion of the layout, readability, use of graphical elements, and so on. The user can be asked to rate a site in any number of these or other dimensions. In some embodiments, the user might also be able to give an overall rating, or an overall rating could be computed from the ratings given to each aspect.

Annotations can include any number of fields in any combination and may include more fields, fewer fields, or different fields from those described herein. For example, the user might also be able to indicate whether a page or site being annotated belongs to some general category of content, e.g., "adult" or "foreign" or "spam." The user can then choose to include or exclude content identified (by the user and/or her trust network members) as belonging to that category during searches. In addition, information about which pages or sites different users have categorized in one or another of these categories can be used to infer that the page or site in question should be treated as such on a global basis. Thus, for instance, if a large number of users identify a particular page as spam, that page might be excluded from or given a lower ranking in all future search results.

Annotations in some embodiments may also include metadata that is not user-specific. For example, metadata might also include a real-world location (e.g., latitude and longitude coordinates, street address or the like) or phone number related to the subject page or site, a UPC (universal product code) or ISBN (international standard book number) or ISSN (international standard serial number) related to the subject page or site, indicators as to whether the page or site launches pop-up windows, or the like. In addition, metadata relating to various attributes of the subject page or site, such as whether it includes adult content or is in a foreign language or the like, could also be incorporated into an annotation independently of user input.

Other interfaces for viewing and interacting with annotations may also be provided. For example, in one embodiment, annotation data is automatically displayed (e.g., in line with page content or in an overlay) every time an annotated page is displayed in the user's browser content. Automatic display of annotation data may be limited to the browsing user's own annotations or extended to include automatic display of annotation data from some or all of the other members of the user's trust network. In some embodiments, each user may be able to indicate preferences for which other users' annotations should be automatically displayed.

As described above, some embodiments allow the user to control whether an annotation should apply to a single page or to a group of pages (a site). In addition, in some embodiments, users might also be able to apply an annotation to all pages registered to the same domain name registrant as the annotated page. The existence of a common domain name registrant may be determined using WHOIS or another similar service.

In other embodiments, a provider of search server 160 may also offer sponsored links, in which content providers pay to have links to their sites provided in search results. Sponsored links are usually displayed in a designated section of the results page, segregated from the regular search results. In one embodiment of the present invention, any sponsored links that the user, trust network, or community (as applicable) has annotated can also be marked. For instance, a sponsored link might have highlighting to indicate that at least one member of the user's trust network has an annotation for that page, and the trust network's average or aggregate rating (if any) for the sponsored link might be used in determining the highlighting, just as for the regular search results as described above. Sponsored links may also be accompanied by a "Save This" button, a "Show My Web" button, or similar buttons or interface controls.

In some embodiments, a user may be able to define multiple lists of friends, e.g., for searches over different (but possibly overlapping) corpi. For example, a Web search provider might allow the user to search within different "properties" such as a Shopping property (including primarily sites where goods and services are offered for sale), a News property (including primarily sites that report and comment on current events), and so on. In one such embodiment, the user might define one list of friends for general Web searches, another for searches within the Shopping property, yet another for searches within the News property, and so on. To the extent that the lists are different, the user will have different trust networks for each category of search. If the user searches in a property where she has not defined a property-specific list of friends, her general list might be used.

In other embodiments, the user may be able to associate different friends with specific keywords, with a particular friend being included in the trust network only when the user's query includes that keyword as a search term.

In some embodiments, users might also be able to define lists of friends for applications other than search. For example, many e-mail account providers include various spam filters, as well as giving a user the option to report an incoming message as spam or non-spam (e.g., so that operation of the spam filter can be reviewed and improved upon). Suppose that user A has defined a friend list for e-mail and that a trust network defined using A's friend list includes user B. Suppose further that user B reports a particular message as spam and that user A subsequently receives the same (or a very similar) message. User A might receive some indication that someone in user A's e-mail trust network (who might or might not be identified as user B) thinks this message is spam, or the message might be redirected to user A's "Junk" e-mail folder or some other action taken to alert user A to an increased likelihood that the message is spam.

The embodiments described herein may make reference to Web sites, URLs, links, and other terminology specific to instances where the World Wide Web (or a subset thereof) serves as the search corpus. It should be understood, however, that the systems and methods described herein can be adapted for use with a different search corpus (such as an electronics database or document repository) and that search reports or annotations may include content as well as links or references to locations where content may be found.

Computer programs incorporating various features of the present invention may be encoded on various computer readable media for storage and/or transmission; suitable media include magnetic disk or tape, optical storage media such as CD or DVD, flash memory, and carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

While the present invention has been described with reference to specific hardware and software components, those skilled in the art will appreciate that different combinations of hardware and/or software components may also be used, and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A method for responding to a user query, the method comprising:
   receiving a query submitted by a querying one of a plurality of users;
   searching a corpus comprising a plurality of documents to identify one or more hits, wherein each hit is a document in the corpus that is determined to be relevant to the query;
   building a trust network for the querying user, the trust network having as members a subset of the plurality of users including at least one user other than the querying user explicitly identified by the querying user as a friend, wherein the members of the trust network are members of a selected community of users, the selected community being selected by the querying user;
   providing a trust network interface operable by the plurality of users to identify others of the plurality of users as friends;
   receiving identifications of friends from a plurality of inputting users, including the querying user, via the trust network interface;
   storing a list of identified friends for each inputting user;
   accessing a store of annotations created by the plurality of users, each annotation being associated with a subject one of the documents in the corpus and with a creating one of the plurality of users, each annotation including user-specific metadata related to the subject document, wherein the user-specific metadata included in each annotation includes a rating of the subject document;
   identifying, as an annotated hit, each of the hits that is the subject document of at least one matching annotation, wherein the creating user of each matching annotation is one of the members of the trust network;
   obtaining an annotation rating from each matching annotation, the annotation rating being a rating of the annotation, and computing an average annotation rating based at least in part on a degree of separation of the creating user in the trust network relative to the querying user;
   generating a search report including a listing of the hits, wherein for each annotated hit, the search report includes information about at least one of the matching annotations, wherein an order for the listing of the hits is determined based at least in part on the average annotation ratings of the annotated hits;
   providing in the search report, for a given annotated hit, a control element operable by the querying user to request a display of the user-specific metadata of at least one of the matching annotations; and
   transmitting the search report and the user-specific metadata of at least one matching annotation to the querying user.

2. The method of claim 1 wherein building the trust network for the querying user includes:
   retrieving a list of identified friends for the querying user; and
   adding, as a member of the trust network, at least one of the identified friends of the querying user.

3. The method of claim 2 wherein building the trust network for the querying user further includes:
   retrieving a list of identified friends for a first one of the trust network members; and
   adding, as a member of the trust network, at least one of the identified friends of the first one of the trust network members.

4. The method of claim 3 wherein building the trust network for the querying user further includes:
   adding, as members of the trust network, identified friends of the trust network members that are connected to the querying user with a degree of separation that does not exceed a maximum value.

5. The method of claim 2 wherein building the trust network for the querying user further includes:
   adding the querying user to the trust network as a member.

6. The method of claim 1 further comprising:
   assigning a trust weight to each friend in the list of identified friends.

7. The method of claim 6 wherein the trust weight is assigned based on a user input received via the trust network interface.

8. The method of claim 7 wherein building the trust network for the querying user includes:
   selecting a user to add to the trust network as a member based at least in part on the trust weight.

9. The method of claim 1 wherein building the trust network for the querying user includes:
   automatically populating a list of identified friends for the querying user from a list of users with whom the querying user communicates.

10. The method of claim 9 wherein the list of users with whom the querying user communicates includes a list of instant messaging contacts maintained by the querying user.

11. The method of claim 9 wherein the list of users with whom the querying user communicates includes an e-mail address book maintained by the querying user.

12. The method of claim 9 wherein the list of users with whom the querying user communicates includes a list of members of a community to which the querying user belongs.

13. The method of claim 9 further comprising:
   providing a trust network interface operable by the querying user to edit the automatically populated list of friends.

14. The method of claim 1 wherein the querying user is also a member of the selected community.

15. The method of claim 1 wherein the querying user is not a member of the selected community.

16. The method of claim 1 further comprising:
   receiving from the querying user an identifier of the selected community.

17. The method of claim 1 wherein the querying user is one of the members of the trust network.

18. The method of claim 1 wherein the search report visual highlight element applied to each hit that is an annotated hit.

19. The method of claim 18 wherein the user-specific metadata included in the annotations includes a rating, the method further comprising:
   for each annotated hit, extracting a rating from each matching annotation and computing an average rating,
   wherein the visual highlight element applied to each annotated hit depends on the average rating.

20. The method of claim 1 wherein generating the search report further includes:
   for each annotated hit, providing in the search report information extracted from at least one of the matching annotations.

21. The method of claim 1 wherein generating the search report further includes: generating a separate listing including only annotated hits.

22. The method of claim 1 further comprising:
searching the store of annotations to identify one or more additional annotated hits, wherein each additional annotated hit corresponds to a document in the corpus for which the store of annotations includes an associated annotation for which the creating user is one of the trust network members and the associated annotation includes user-specific metadata that is determined to be relevant to the query; and
incorporating the additional annotated hits into the listing of the hits in the search results page.

23. The method of claim 22 wherein searching the corpus includes:
extracting a search term from the user query; and
identifying as a hit each document in the corpus that contains the search term.

24. The method of claim 23 wherein searching the store of annotations includes identifying as an additional annotated hit each document in the corpus for which the user-specific metadata includes the search term.

25. The method of claim 1 wherein the store of annotations further includes at least one annotation that is associated with a group of documents in the corpus and wherein any it that is one of the group of documents is identified as an annotated hit.

26. The method of claim 1 wherein the user-specific metadata includes an item of information explicitly input by the user.

27. The method of claim 26 wherein the item of information is a rating of the associated document.

28. The method of claim 26 wherein the item of information is a keyword describing the associated document.

29. The method of claim 26 wherein the item of information is a label selected from a predefined vocabulary.

30. The method of claim 26 wherein the item of information is a description of the associated document.

31. The method of claim 1 wherein the corpus includes a plurality of World Wide Web pages.

32. The method of claim 1 wherein the user is a human.

33. The method of claim 1 wherein the user is a computer.

34. A method for responding to a user query, the method comprising:
receiving a query submitted by a querying one of a plurality of users;
building a trust network for the querying user, the trust network having as members a subset of the plurality of users including at least one user other than the querying user explicitly identified by the querying user as a friend, wherein the members of the trust network are members of a selected community of users, the selected community being selected by the querying user;
providing a trust network interface operable by the plurality of users to identify others of the plurality of users as friends;
receiving identifications of friends from a plurality of inputting users, including the querying user, via the trust network interface;
storing a list of identified friends for each inputting user;
accessing a store of annotations created by the plurality of users, each annotation being associated with a subject one of a plurality of documents belonging to a corpus and with a creating one of the plurality of users, each annotation further including user-specific metadata related to the subject document, wherein the user-specific metadata included in each annotation includes a rating of the subject document;
identifying one or more hits, wherein each hit is a document in the corpus that is determined to be relevant to the query and wherein each hit further is the subject document of at least one matching annotation, wherein the creating user of each matching annotation is one of the trust network members, and obtaining an annotation rating from each matching annotation, the annotation rating being a rating of the annotation, and computing an average annotation rating based at least in part on a degree of separation of the creating user in the trust network relative to the querying user;
generating a search report including a listing of the hits, wherein the hits in the listing are placed in an order determined based at least in part on the average annotation ratings of the hits;
providing in the search report, for a given hit, a control element operable by the querying user to request a display of the user-specific metadata of at least one of the matching annotations; and
transmitting the search report and the user-specific metadata of the at least one matching annotation to the querying user.

35. The method of claim 34 wherein identifying the one or more hits includes comparing the query to contents of documents in the corpus.

36. The method of claim 34 wherein identifying one or more hits includes comparing the query to the user-specific metadata of annotations in a search pool of annotations for which the creating user is one of the trust network members.

37. The method of claim 36 wherein identifying one or more hits further includes:
extracting a search term from the query; and
detecting, for each of the annotations in the search pool, whether the search term is present in the user-specific metadata,
wherein the associated document is identified as a hit in the event that the search term is present in the user-specific metadata.

38. The method of claim 37 further comprising:
for each document that is the subject document of at least one of the annotations in the search pool, detecting whether the search term is present in the document,
wherein the document is identified as a hit in the event that the search term is present in the document.

39. The method of claim 37 wherein the user-specific metadata includes a plurality of fields and wherein the query specifies which of the fields are to be considered during the act of detecting.

40. The method of claim 34 wherein the search report further includes, for each hit, at least some of the user-specific metadata from at least one of the matching annotations.

41. The method of claim 34 wherein the store of annotations further includes at least one annotation that is associated with a group of documents in the corpus and wherein any document that is one of the group of documents is identified as a hit.

42. The method of claim 34 wherein the corpus is the World Wide Web.

43. The method of claim 34 wherein the user is a human.

44. The method of claim 34 wherein the user is a computer.

45. A computer system for responding to user queries from a plurality of users, the system comprising:
an index data store configured to store a searchable representation of a plurality of documents belonging to a corpus;

a personalization data store configured to store annotations, each annotation being associated with a subject one of the documents in the corpus and with a creating one of the plurality of users, each annotation including user-specific metadata related to the subject document, wherein the user-specific metadata included in each annotation includes a rating; and a search server communicably coupled to the index data store and the personalization data store, the search server including:

input control logic configured to receive a query from a querying one of the plurality of users;

search control logic configured to search the index data store to identify one or more hits, wherein each hit is a document in the corpus that is determined to be relevant to the received query;

trust network control logic configured to:

(a) build a trust network for the querying user, the trust network having as members a subset of the plurality of users including at least one user other than the querying user explicitly identified by the querying user as a friend, wherein the members of the trust network are members of a selected community of users, the selected community being selected by the querying user;

(b) provide a trust network interface operable by the plurality of users to identify others of the plurality of users as friends;

(c) receive identifications of friends from a plurality of inputting users, including the querying user, via the trust network interface; and (d) store a list of identified friends for each inputting user;

personalization control logic configured to identify, as an annotated hit, each of the hits that is the subject document of at least one matching annotation, wherein the creating user of each matching annotation is one of the members of the trust network, the personalization control logic being further configured to obtain an annotation rating from each matching annotation, the annotation rating being a rating of the annotation and compute an average annotation rating based at least in part on a degree of separation of the creating user in the trust network relative to the querying user; and reporting control logic configured to generate a search report including a listing of the hits, the search report further including, for each annotated hit, information about at least one of the matching annotations, wherein an order for the listing of the hits is determined based at least in part on the average ratings of the annotated hits, the reporting control logic being further configured to provide in the search report, for a given annotated hit, a control element operable by the querying user to request a display of the user-specific metadata of at least one of the matching annotations, the reporting control logic being further configured to transmit the search report along with the user-specific metadata for display to the querying user.

46. A computer system for responding to user queries from a plurality of users, the system comprising:

an index data store configured to store a searchable representation of a plurality of documents belonging to a corpus;

a personalization data store configured to store annotations, each annotation being associated with a subject one of the documents in the corpus and with a creating one of the plurality of users, each annotation including user-specific metadata related to the subject document, wherein the user-specific metadata included in each annotation includes a rating; and a search server communicably coupled to the index data store and the personalization data store, the search server including:

input control logic configured to receive a query from a querying one of the plurality of users;

trust network control logic configured to build a trust network for the querying user, the trust network having as members a subset of the plurality of users including at least one user other than the querying user explicitly identified by the querying user as a friend, wherein the members of the trust network are members of a selected community of users, the selected community being selected by the querying user, the trust network control logic further configured to provide a trust network interface operable by the plurality of users to identify others of the plurality of users as friends the trust network, to receive identifications of friends from a plurality of inputting users, including the querying user, via the trust network interface, and store a list of identified friends for each inputting user;

search control logic configured to identify, as a hit, one or more of the documents from the corpus, wherein each hit is determined to be relevant to the query and wherein each hit further is the subject document of at least one matching annotation, wherein the creating user of each matching annotation is one of the trust network members and obtaining an annotation rating from each matching annotation, the annotation rating being a rating of the annotation, and computing an average annotation rating based at least in part on a degree of separation of the creating user in the trust network relative to the querying user; and reporting control logic configured to generate a search report including a listing of the hits, wherein the hits in the listing are placed in an order determined based at least in part on the ratings of the hits, the reporting control logic being further configured to provide in the search report, for a given hit, a control element operable by the querying user to request a display of the user-specific metadata of at least one of the matching annotations, the reporting control logic being further configured to transmit the search report along with the user-specific metadata for display to the user.

\* \* \* \* \*